United States Patent
Hasegawa et al.

(10) Patent No.: US 7,536,649 B2
(45) Date of Patent: May 19, 2009

(54) APPARATUS, SYSTEM, AND SERVER CAPABLE OF EFFECTIVELY SPECIFYING INFORMATION IN DOCUMENT

(75) Inventors: Takefumi Hasegawa, Tokyo (JP); Akira Suzuki, Kanagawa (JP); Masami Mori, Tokyo (JP)

(73) Assignee: Ricoh Company, Ltd., Yokohama-shi (JP)

( * ) Notice: Subject to any disclaimer, the term of this patent is extended or adjusted under 35 U.S.C. 154(b) by 329 days.

(21) Appl. No.: 11/484,850

(22) Filed: Jul. 12, 2006

(65) Prior Publication Data

US 2007/0022114 A1 Jan. 25, 2007

(30) Foreign Application Priority Data

Jul. 14, 2005 (JP) ............................. 2005-205835

(51) Int. Cl.
*G06F 13/00* (2006.01)
*G06F 15/00* (2006.01)
(52) U.S. Cl. ........................................ 715/764; 715/851
(58) Field of Classification Search ......... 715/764–767, 715/700, 851, 853–855, 840; 345/157, 173
See application file for complete search history.

(56) References Cited

U.S. PATENT DOCUMENTS

| 7,190,351 B1 * | 3/2007 | Goren | 345/173 |
| 2003/0009567 A1 * | 1/2003 | Farouk | 709/229 |

FOREIGN PATENT DOCUMENTS

| JP | 2001-101218 | 4/2001 |
| JP | 2002-251390 | 9/2002 |

OTHER PUBLICATIONS

Tanaka-Ishii, Kumiko et al. (2002). "Can Japanese be Estimated Only From Consonants?," *Information Processing Society of Japan* 43(10):1 page with English abstract attached.
NTT DoCoMo, Inc. "Translation Using a Cellular Phone with a Camera," located at <http://www.docomo-chugoku.co.jp/v/solution/news/2005/mobile.html> visited on Feb. 28, 2005. (1 page with English abstract attached).
Tegic Communications, Inc. "T9® Test Input for Keypad Devices," located at <http://www.t9.com/japan/> visited on visited on Feb. 28, 2005. (1 page with English abstract attached).
Nippon Telegraph and Telephone West Corporation. "The Operation Method of Annai Jozu (Telephone Number Guide)," located at <http://www.ntt-west.co.jp/anjozu/sousa.html> vistited on Feb. 28, 2005. (2 pages with English abstract attached).

* cited by examiner

*Primary Examiner*—Kevin Nguyen
(74) *Attorney, Agent, or Firm*—Morrison & Foerster LLP

(57) ABSTRACT

A word information in a document printed on paper etc. may be specified easily. Especially, it enables to specify easily and correctly from the word information input partially. In one example, an information specification system specifying an arbitrary word information in a document, includes an information specification apparatus to select a specified candidate word information. The apparatus has document specification mechanism to input a specification information for specifying the document, and a character input mechanism to input the word information. The word information is searched in the specified document by using the word information which is partially input by the character input mechanism to select the specified candidate word information.

11 Claims, 22 Drawing Sheets

FIG. 2

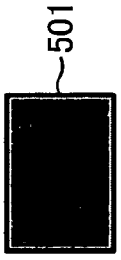

In order to reduce impact given to the environment by its products, Ricoh has developed a new energy saving technology called "QSU*1". Compatibility of power consumption reduction in standby mode and default time reduction from energy saving mode has been accomplished. Such advanced technology is installed in the latest major product series: imagio Neo. It was awarded the Energy-saving Grand Prix*2 for 2 years in a row in 2000 and 2001. The products are favorably introduced to the offices worldwide as energy saving copiers that anybody can comfortably operate. Ricoh will continue to pursue energy saving performances also in the future product development and contribute to $CO_2$ emission reduction of overall society.

*http://www.ricoh.com/environment/global/articles/4.html*

FIG. 3

```
<?xml version="1.0" ?>

<R-Document >
<Document-Attribute>
    <Title>
        Apache Ant
    </Title>
</Document-Attribute>
<Document-Location>
    <Document-DB    URL = "http://www.ABC.com/document/ ABC/">
        <Document-ID    ID = "5837-83897-532">
    </Document-DB >
</ Document-Location >
</R-Document >
```

FIG. 8

KEYSTROKE HISTORY

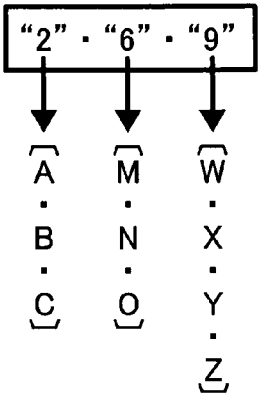

TEXT OF SPECIFIED DOCUMENT

In order to reduce impact given to the environment by its products, Ricoh has developed a new energy saving technology called "QSU*1". Compatibility of power consumption reduction in standby mode and default time reduction from energy saving mode has been accomplished. Such advanced technology is installed in the latest major product series: imagio Neo. It was awarded the Energy-saving Grand Prix*2 for 2 years in a row in 2000 and 2001. The products are favorably introduced to the offices worldwide as energy saving copiers that <u>anybody</u> can comfortably operate. Ricoh will continue to pursue energy saving performances also in the future product development and contribute to CO2 emission reduction of overall society

 CANDIDATE WORDS CORRESPONGING TO "2" KEY

SAVED CANDIDATE WORDS

Compatibility consumption and accomplished advanced awarded are as copiers <u>anybody</u> can comfortably continue also contribute CO2

 CANDIDATE WORDS CORRESPONGING TO "6" KEY

SAVED CANDIDATE WORDS

Compatibility consumption and copiers <u>anybody</u> comfortably continue contribute CO2

 CANDIDATE WORDS CORRESPONGING TO "9" KEY

SAVED CANDIDATE WORDS

<u>anybody</u>

FIG. 9

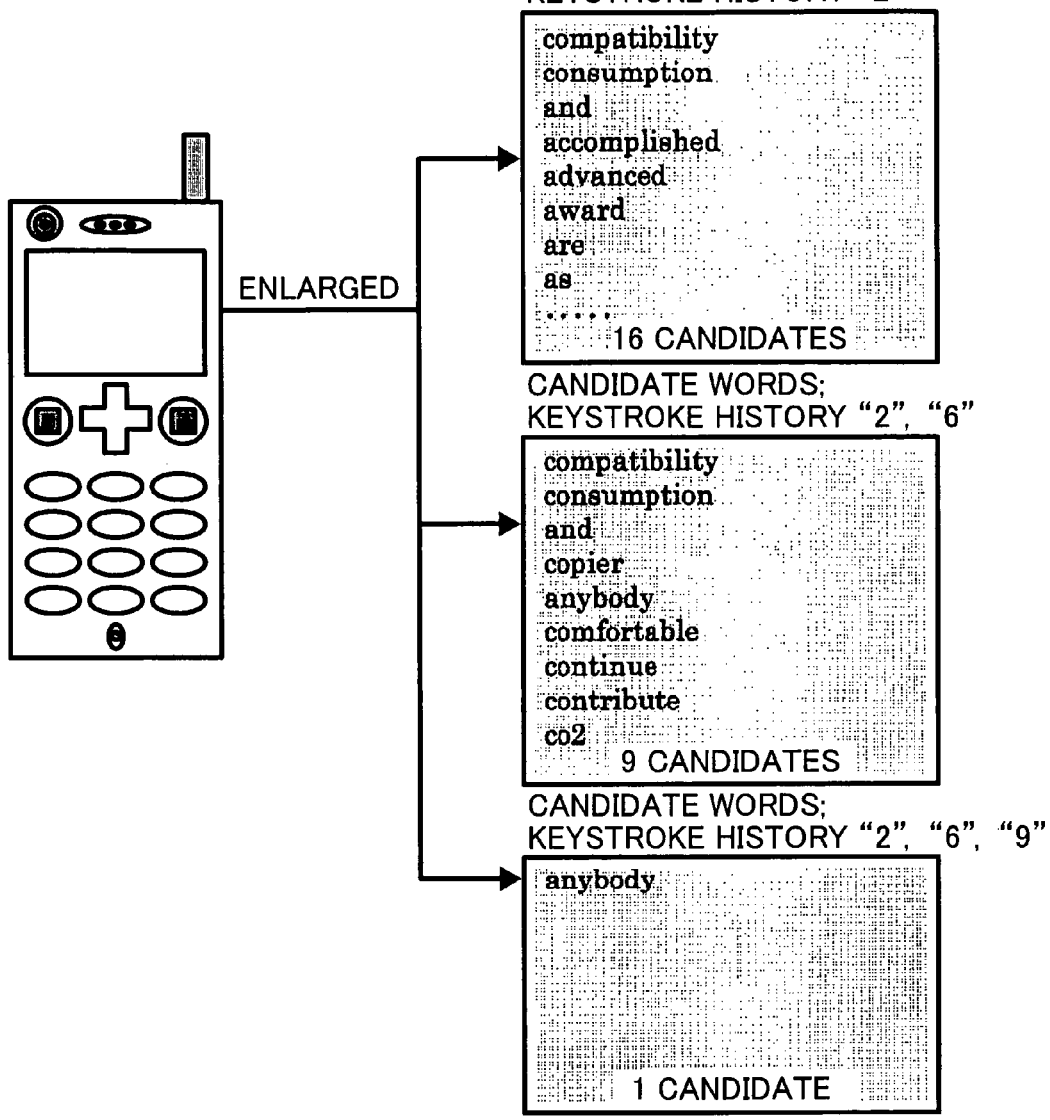

TEXT OF SPECIFIED DOCUMENT

In order to reduce impact given to the environment by its products, Ricoh has developed a new energy saving technology called "QSU*1". *Compatibility* of power *consumption* reduction in standby mode *and* default time reduction from energy saving mode has been accomplished. Such advanced technology is installed in the latest major product series: imagio Neo. It was awarded the Energy-saving Grand Prix*2 for 2 years in a row in 2000 *and* 2001. The products are favorably introduced to the offices worldwide as energy saving *copiers* that <u>anybody</u> can *comfortably* operate. Ricoh will *continue* to pursue energy saving performances also in the future product development *and contribute* to *CO2* emission reduction of overall society.

FIG. 12

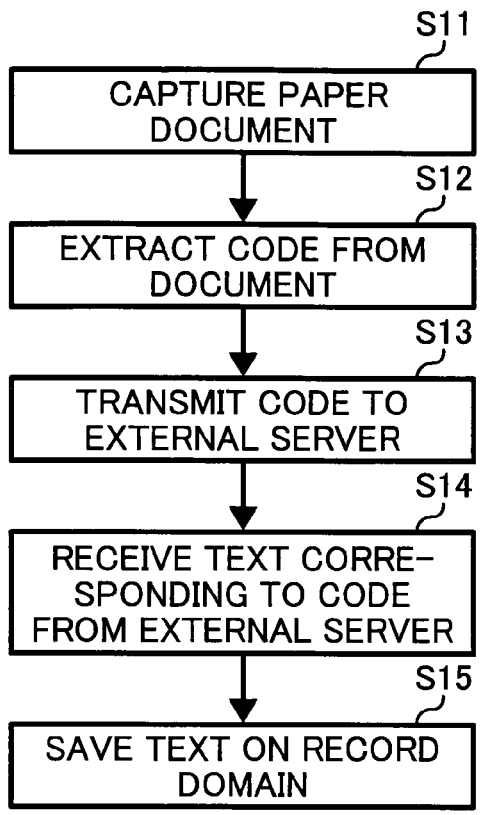

S11 CAPTURE PAPER DOCUMENT
S12 EXTRACT CODE FROM DOCUMENT
S13 TRANSMIT CODE TO EXTERNAL SERVER
S14 RECEIVE TEXT CORRESPONDING TO CODE FROM EXTERNAL SERVER
S15 SAVE TEXT ON RECORD DOMAIN

FIG. 13

| CODE INFORMATION | ELECTRONIC DOCUMENT |
|---|---|
| http://www.ABC/ 5837-83897-532 | ELECTRONIC DOCUMENT OF APACHE ANT |
| http://www.ABC/ 3567-95675-421 | ELECTRONIC DOCUMENT OF LEARNING ENGLISH |
| http://www.ABC/ 7345-19385-971 | ELECTRONIC DOCUMENT OF PAPER ABC |

```
<?xml version="1.0" ?>

<R-Document >
    <Document-Attribute>
        <Title>
            Apache Ant
        </Title>
        <Dictionary>
            <URL>
                http://www.ABC.com/dictionary /EtoJ /
            </URL>
        </Dictionary>
    </Document-Attribute>
    <Document-Location>
        <Document-DB   URL = "http://www.ABC.com/document/ ABC/">
            <Document-ID   ID = "5837-83897-632">
        </ Document-DB >
    </ Document-Location >
</R-Document >
```

FIG. 19

TEXT OF SPECIFIED DOCUMENT

In order to reduce impact given to the environment by its products, Ricoh has developed a new energy saving technology called "QSU*1". Compatibility of power consumption reduction in standby mode and default time reduction from energy saving mode has been accomplished. Such advanced technology is installed in the latest major product series: imagio Neo. It was awarded the Energy-saving Grand Prix*2 for 2 years in a row in 2000 and 2001. The products are favorably introduced to the offices worldwide as energy saving copiers that anybody can comfortably operate. Ricoh will continue to pursue energy saving performances also in the future product development and contribute to CO2 emission reduction of overall society

⬇ SELECT ONE SENTENCE INCLUDING SPECIFIED WORD "ANYBODY"

The products are favorably introduced to the offices worldwide as energy saving copiers that anybody can comfortably operate.

FIG. 25

ORIGINAL DOCUMENT

In order to reduce impact given to the environment by its products, Ricoh has developed a new energy saving technology called "QSU*1". Compatibility of power consumption reduction in standby mode and default time reduction from energy saving mode has been accomplished. Such advanced technology is installed in the latest major product series: imagio Neo. It was awarded the Energy-saving Grand Prix*2 for 2 years in a row in 2000 and 2001. The products are favorably introduced to the offices worldwide as energy saving copiers that anybody can comfortably operate. Ricoh will continue to pursue energy saving performances also in the future product development and contribute to CO2 emission reduction of overall society.

⟶

EXAMPLE 1: POSTSCRIPT (IMAGE) IN DOCUMENT

In order to reduce impact given to the environment by its products, Ricoh has developed a new energy saving technology called "QSU*1". Compatibility of power consumption reduction in standby mode and default time reduction from energy saving mode has been accomplished. Such advanced technology is installed in the latest major product series: imagio Neo. It was awarded the Energy-saving Grand Prix*2 for 2 years in a row in 2000 and 2001. The products are favorably introduced to the offices worldwide as energy saving copiers that anybody can comfortably operate.

Ricoh will continue to pursue energy saving performances also in the future product development and contribute to CO2 emission reduction of overall society.

↓

EXAMPLE 2: POSTSCRIPT (IMAGE) AS LINK

In order to reduce impact given to the environment by its products, Ricoh has developed a new energy saving technology called "QSU*1". Compatibility of power consumption reduction in standby mode and default time reduction from energy saving mode has been accomplished. Such advanced technology is installed in the latest major product series: imagio Neo. It was awarded the Energy-saving Grand Prix*2 for 2 years in a row in 2000 and 2001. The products are favorably introduced to the offices worldwide as energy saving copiers that anybody can comfortably operate. Ricoh will continue to pursue energy saving performances also in the future product development and contribute to CO2 emission reduction of overall society.

LINK ⟶ 

APPARATUS, SYSTEM, AND SERVER CAPABLE OF EFFECTIVELY SPECIFYING INFORMATION IN DOCUMENT

BACKGROUND OF THE INVENTION

1. Field of the Invention

The present invention relates to an information specification system, a server, and an information specification apparatus, capable of specifying word information easily by using the word information input partially from the information specification apparatus. The present invention is suitable in a case, for example, specifying the word information in a document.

2. Discussion of the Background

Using a pointing device, or using a smaller number of keys than the character kinds in which the each key represents a plurality of characters are proposed for simplifying input information when specifying a word in a document on a display in a background art.

It is possible to specify the word information using a pointing device in a case, for example, finding a word that the meaning may not be understood in a present document, or correcting an error, proofreading a text, etc. It is also possible to start an application for displaying the meaning, correcting, and proofreading on the display. However, if the document is printed out on a paper sheet, the specification with the pointing devices may not be used.

It will be necessary to input the word information again by using a keyboard in such the case. As one example of the method of inputting words, using a smaller number of keys than the character kinds is proposed. In another example, using only keys corresponding to consonants of the words is proposed.

However, it is complicated to select the candidate word in the background art. For example, there is a method in which learning from the past input is used for this selection. But, the learning effect may not be expected in a case that the document is others' document or is seen for the first time. Further, it is invalid to learn a word which is not be understood or an error word. Furthermore, it is also proposed to judge a tendency of the word which is used for whole present document. But, it also becomes complicated to select a candidate word because enormous processing and a program for it is needed.

A method of recognizing image of captured word by OCR (Optical Character Recognition) processing is proposed as another specification mechanism of the words. A camera function of a personal digital assistant is used for capturing image of a portion of the document in which the word is contained. Further, a bar code may be added to the whole document. It is also proposed to read this code information with a wand reader etc., and to specify the word corresponding to this code. In these methods, there is a problem that special processing or special equipments are required.

SUMMARY OF THE INVENTION

A novel information specification system, a server, and an information specification apparatus for effectively specifying information. In one example, a novel information specification system specifying an arbitrary word information in a document, includes an information specification apparatus to select a specified candidate word information. The apparatus has document specification mechanism to input a specification information for specifying the document, and a character input mechanism to input the word information. The word information is searched in the specified document by using the word information which is partially input by the character input mechanism to select the specified candidate word information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 illustrates an example of a paper document which is used in the information specification system of FIG. 1;

FIG. 3 illustrates an example of 2-dimensional code information which is included in the paper document of FIG. 2;

FIG. 8 illustrates an example of a selection method of candidate words in the information specification system of FIG. 1;

FIG. 9 illustrates an example of a screen which displays the candidate words of FIG. 8;

FIG. 12 is a flowchart of a detailed example of a document specification processing indicated as the steps S1 and S2 in FIG. 7;

FIG. 13 illustrates an example of a documentation management database in the information specification system of FIG. 1;

FIG. 19 illustrates an example as selecting one sentence including a specified word from a specified document;

FIG. 25 illustrates an example that postscript processing information is written in a document;

DETAILED DESCRIPTION OF PREFERRED EMBODIMENTS

Figure 1:
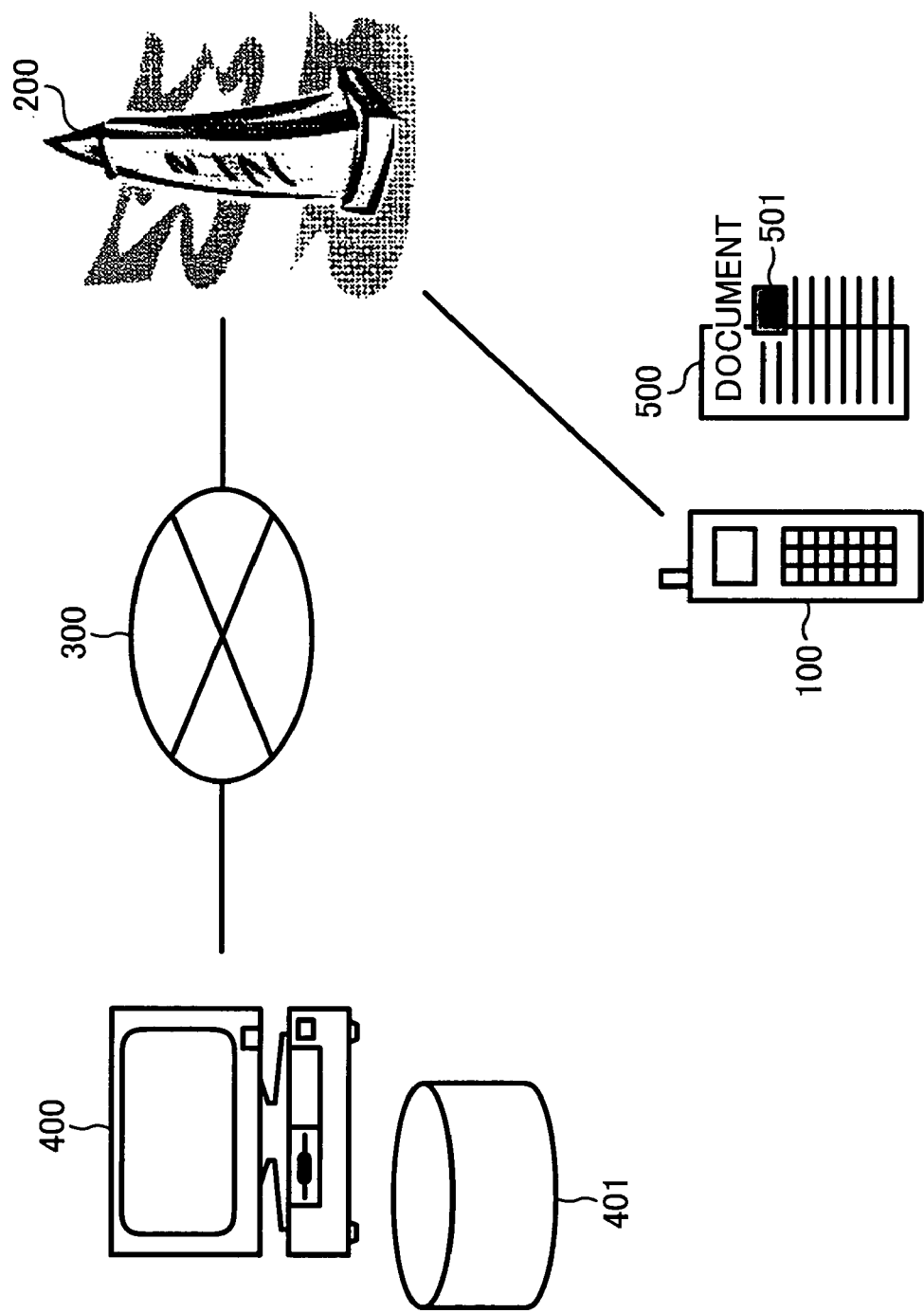
FIG. 1 is an illustration illustrating an example configuration of an information specification system according to an example embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an illustration illustrating a configuration of an embodiment of the present invention which includes an information specification system, a server, and an information specification apparatus for specifying information.

In the system of FIG. 1, a personal digital assistant, for example, a cellular-phone, is used as an information specification apparatus 100. This information specification apparatus 100 is connected to a communications network 300, such as the Internet, through a base station 200, and an external server 400 which has a documentation management database 401 in which an electronic document is stored is further connected to this communications network 300. A paper document 500 on which the electronic document is printed is distributed to a user, and a 2-dimensional code information 501 for accessing the electronic document stored in the external server 400 is printed on this paper document 500.

FIG. 2 illustrates an example of the paper document 500 in which the 2-dimensional code information 501 is added. On this paper document 500, the 2-dimensional code information 501 is printed outside a printing area 502 where the electronic document stored in the external server 400 is printed. For example, if the electronic document stored in the external server 400 is directed to print-out, the 2-dimensional code information 501 is generated and printed automatically so that the storing place of the electronic document etc. may be specified and accessed.

FIG. 3 illustrates an example of the 2-dimensional code information 501. In this embodiment, code information is described by a tag format language, such as XML. A <Document Attribute> tag in FIG. 3 shows attribute information of the paper document 500, and information, such as a title name of the document, is recorded in this tag. The title name of this document may be used so as the user to check an obtained document by, for example, displaying it on optional screens etc. when the code information is extracted.

A <Document Location> tag shows a place where the electronic document corresponding to the paper document 500 is saved. The place information includes URL information <Document-DB> tag which shows a place of the external server 400 managing the electronic document and information <Document-ID> tag which specifies the place of the electronic document in the external server 400. By dividing the place information like this, the URL information which shows the external server's 400 installation place may be managed by a communication contractor etc., and the place information which specifies the electronic document may be managed by an operator of the external server 400.

The electronic document corresponding to the paper document 500 may be specified by the information specification apparatus 100. The electronic document saved in the external server 400 corresponding to the paper document 500 may be searched by using the word information specifying the any word in it, and the place information and the word information itself may be specified in this system. Further, it is possible to start arbitrary applications, such as a dictionary function relevant to that information, and a search function, an edit function, by using this specified place information and the word information.

Figure 4:
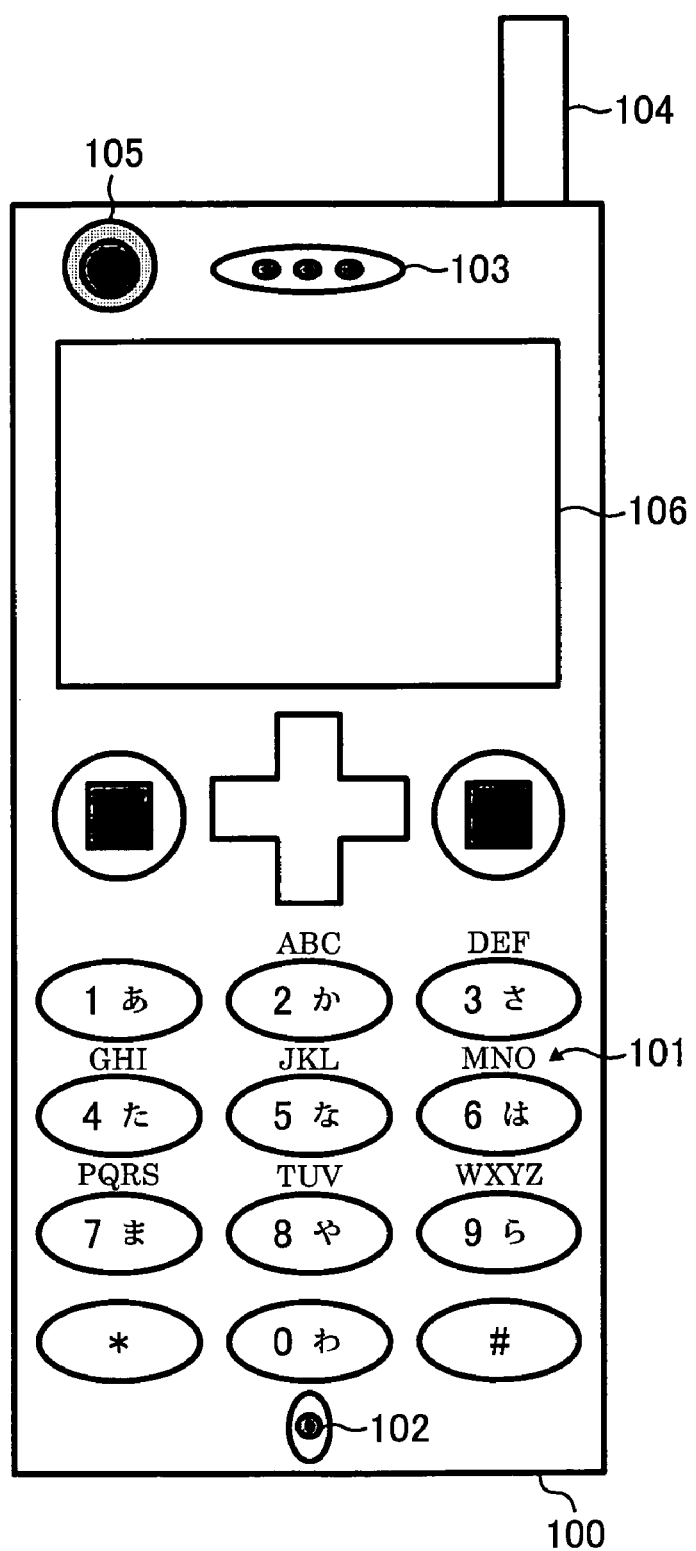
FIG. 4 illustrates an example of a personal digital assistant as an information specification apparatus which is used in the information specification system of FIG. 1.

FIG. 4 illustrates an example of the personal digital assistant as the information specification apparatus 100. So-called cellular-phone is assumed as the personal digital assistant. A keystroke part 101, an audio input part 102, a voice response part 103, a communication part 104, an image input (camera) part 105, and the image output (display) part 106 are provided in this personal digital assistant. A program is prepared so that it is possible to access a specified place by capturing the 2-dimensional code information 501 with the image input part 105.

The keystroke part 101 is used for not only in a case of inputting telephone numbers but also in a case that the user may direct the information specification apparatus 100. In a case a character string is input for selecting a candidate word, or in a case a word is selected from the selected candidate words, the user directs and specifies the word through the keystroke part 101. The image output part 106 is used for not only displaying the specified word input by the keystroke part 101 but also displaying a list of the candidate words selected by the keystroke part 101 as mentioned later.

The image input part 105 is used for capturing image information. When acquiring the code information 501 printed on, for example, the paper document 500 for specifying a document, the code information may be acquired through the image input part 105. The voice response part 103 is used for outputting voice information (conversation with others, key operation sound, audio assist, etc.). It is possible to display the candidate word on a screen of the image output part 106, and to output the candidate word with sound as a candidate information display.

The audio input part 102 is used for inputting voice information (conversation with others, voice operation), and it is capable of selecting a word by inputting the voice information when selecting the word from the selected candidate words. The communications part 106 is used when communicating with the external server 400. When acquiring a text information, which is a specification object on a document, from the external server 400, or acquiring a semantic information of a word from the external server 400, communications processing with the external server 400 is performed through the communications part 106.

In the above-mentioned system, although using the information specification apparatus 100 of this invention for a personal digital assistant like a cellular-phone is mainly considered, the information specification apparatus 100 is not limited to the personal digital assistant, and if the information specification apparatus 100 has the keystroke part 101 for specifying a word, this invention may be applied to any types of the apparatus.

Figure 5:
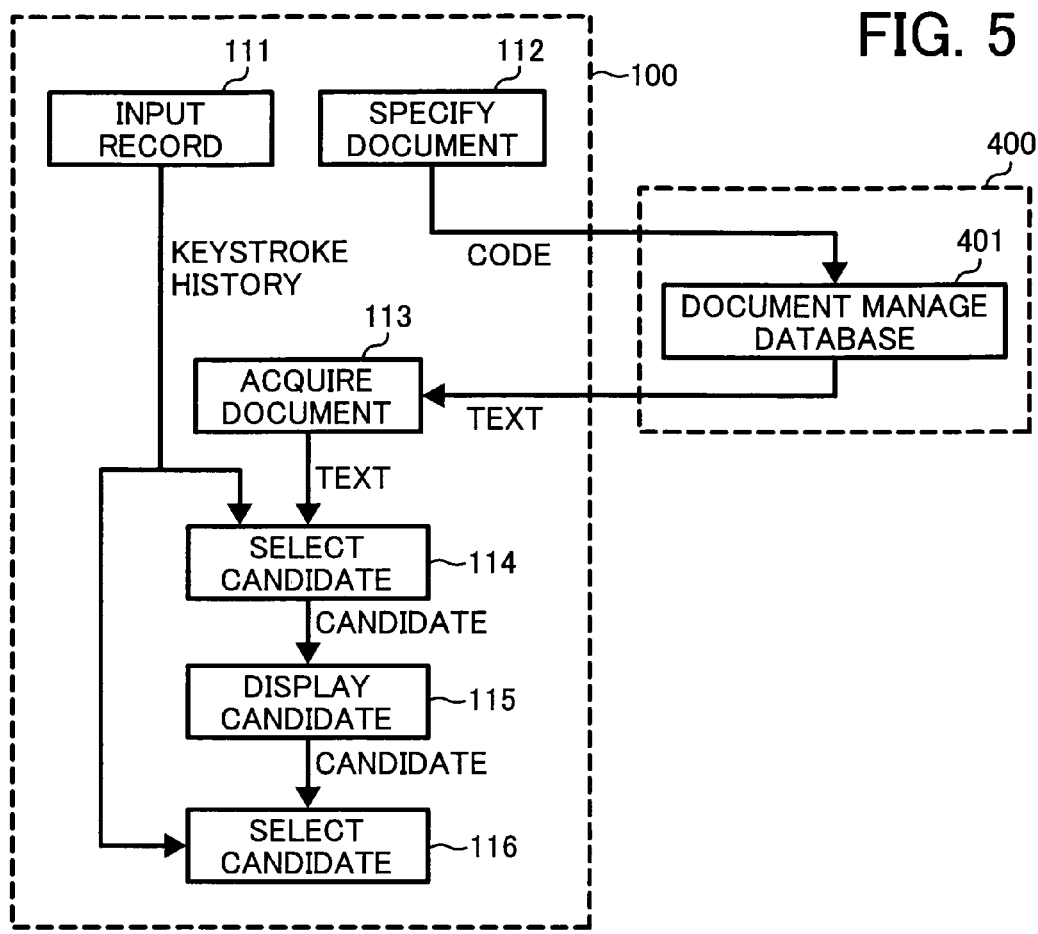
FIG. 5 is a block diagram illustrating functions of the information specification apparatus of FIG. 4.

FIG. 5 is a block diagram illustrating functions of the information specification apparatus 100. In this FIG. 5, an input recorder 111 is a mechanism to receive keystroke information input by a user with the keystroke part 101 when a word is specified from a document, and to record history information of keystroke in a record domain (not shown) of the information specification apparatus 100.

A document specification mechanism 112 is a mechanism to specify the document as the specification object of the word. A method of capturing the code information 501 printed on the paper document 500 shown in FIG. 3 with the image input part 105 shown in FIG. 4 and specifying the document from the captured image information is mentioned as an example of the document specification method. The code information acquired with this document specification mechanism 112 is transmitted to the external server 400, and that the text information on the document corresponding to this code information is taken out from the documentation management database 401, so that it is responded to a document information communication acquisition mechanism 113.

The keystroke history information received by the input recorder 111 is passed to a candidate information selector 114. This candidate information selector 114 is a mechanism to select a candidate word from the text information of the document acquired with the information communication acquisition mechanism 113 with reference to the keystroke history information recorded on the input recorder 111. When the number of the selected candidate words is one, the word is determined as the word which the user wants to specify. Further, when there are two or more candidate words selected with the candidate information selector 114, a candidate information display 115 displays a list of the candidate word groups on the image output part 106 shown in FIG. 4.

That is, the candidate information display 115 is a mechanism to display the candidate word group selected with the candidate information selector 114. A candidate information selector 116 is a mechanism to choose the word which the user wants to specify from the candidate word group displayed on the candidate information display 115. As for a method of selecting, the user chooses the word from the candidate word group displayed on the screen with directing the keystroke part 101. Therefore, when the candidate word displayed on the image output part 106 is chosen, the input recorder 111 transmits the keystroke history information to the candidate information selector 116.

By using the above mechanism, the information specification apparatus 100 which enables to simply specify the word indicated on the paper document 500 may be offered.

Figure 6:
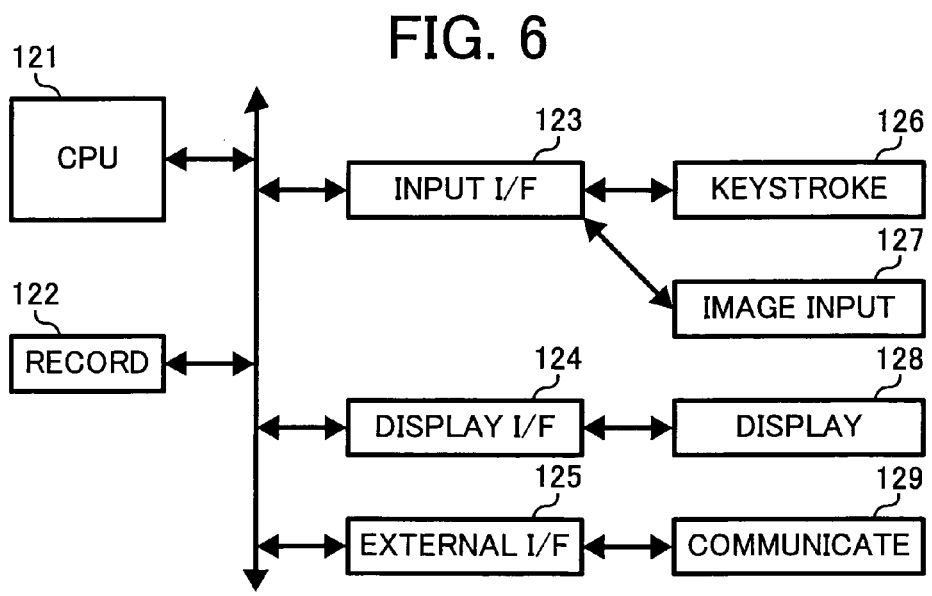
FIG. 6 illustrates an example of a hardware configuration of the information specification apparatus illustrated in FIG. 4.

FIG. 6 illustrates an example of a typical hardware configuration of the information specification apparatus 100. As shown in FIG. 6, the information specification apparatus 100 includes a central processing unit (CPU) 121, an information recording part 122, an input interface (I/F) 123, a display interface (display I/F) 124, and an external interface (external I/F) 125.

The CPU 121 executes a program read by the information recording part 122 under control of an operating system, and realizes processing of the information specification apparatus 100.

The information recording part 122 records the program executed by the CPU 121, the keystroke history information, the information (image information at the time of capturing the code information 501 printed on the paper document 500) which specifies a document, the text information in the document, etc. The information recording part 122 may be installed inside of the information specification apparatus 100, and may be made in the form which can be detached and attached from the information specification apparatus 100 using a flash memory etc. Further, a recording media, such as a hard disk or an optoelectronic memory may be used.

The input I/F 123 includes a keystroke part 126 and an image input part 127. The keystroke part 126 includes two or more manual operation buttons, such as a number key and a cursor key, and the user can input characters etc. and select the candidate word, etc. to the information specification apparatus 100 by using the keystroke part 126.

The image input part 127 includes an image sensor, such as CCD or CMOS, and may capture the code information 501 printed on the paper document 500. The image information acquired by capturing the code information 501 with this image input part 127 is saved in the information recording part 122. Further, image-analysis processing may be performed by using an operation function of the CPU 121, and code information may be extracted from the image information.

The display I/F 124 includes an image output part using a liquid crystal display 128 etc., and a voice response part to display character input information input by the keystroke part 126 and the selected word by the candidate information selector 113.

The external I/F 125 realizes the communications processing between the information specification apparatus 100 and an external apparatus (external server etc.) by a communications processing part 129. As for a mechanism of communication, a connection with a general telephone line through the base stations for personal digital assistants (switchboard etc.) using radiophone functions of PDA (personal digital assistant) or PHS (personal handy-phone system), etc. may be used. The short-distance wireless-data-transmission function of Blue-Tooth or IEEE 802.11 may be used, connecting with web etc. through a base station etc. of the short-distance wireless data transmission near the information specification apparatus 100.

The information specification apparatus 100 which simply specifies the word from the document is realized by using the information specification apparatus 100 including the above hardware.

Figure 7:
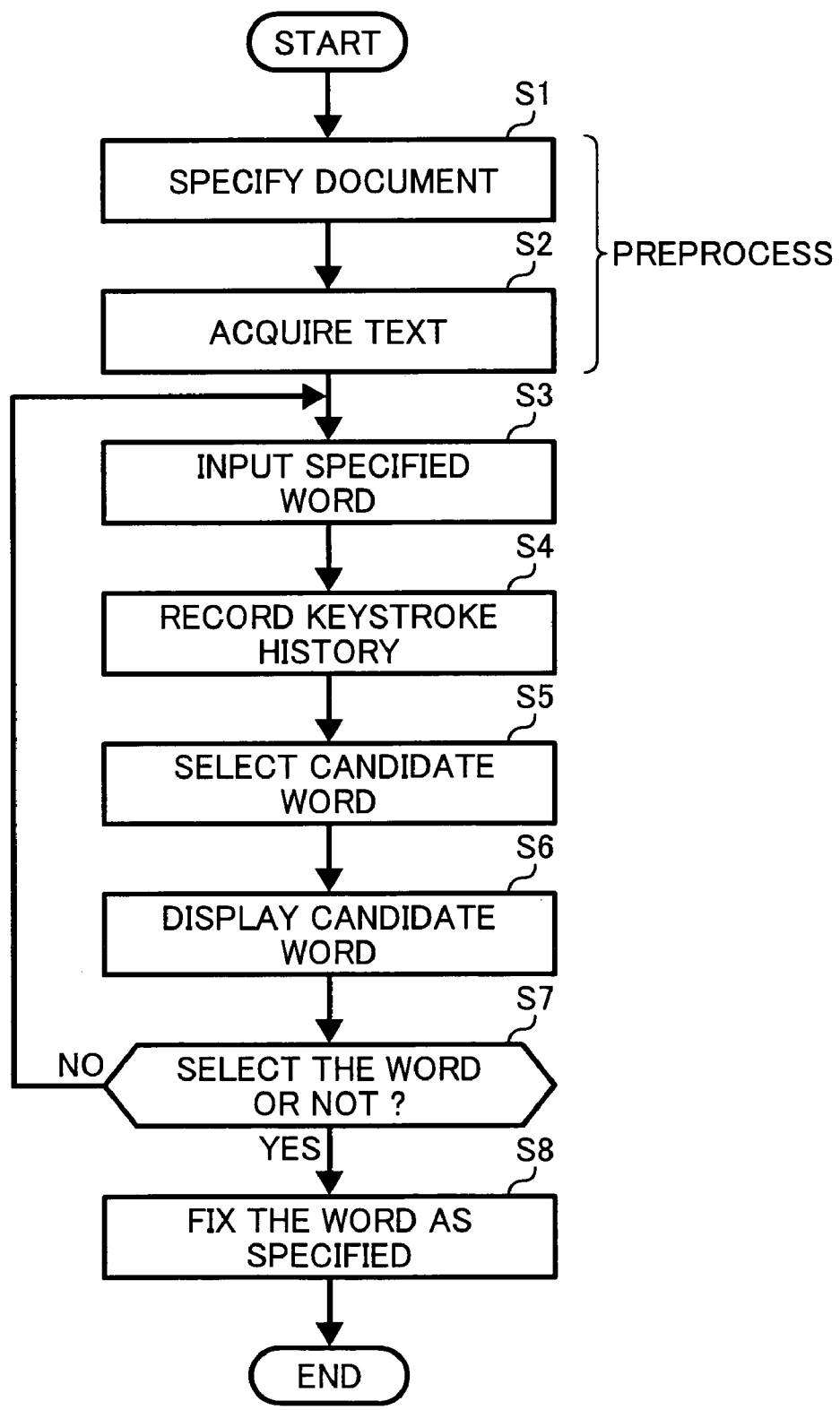
FIG. 7 is a flowchart about a processing of specifying a word from a document using the information specification apparatus of FIG. 4.

FIG. 7 is a whole flowchart about a processing of specifying a word from a document using the information specification apparatus 100.

In FIG. 7, when a process starts, the document specification mechanism 112 of the information specification apparatus 100 specifies a document as the specification object of a word in a step S1. In a step S2, text information of the document specified at the step S1 is acquired. The preprocessing of the whole flowchart is completed by processing of these steps S1 and S2, specifying the document as the specification object of the word, and acquiring the text information of the specific document.

When specifying the word two or more times from the same document, it is necessary to preprocess only once, after that, the word may be specified two or more times from the same document by repeating the processing of steps S3-S8. Further, about the detailed example of the flowchart of the steps S1 and S2 used as the document specification processing of the preprocessing is mentioned later.

In a step S3, the word for specifying is input from the document using the keystroke part. A consonant method for inputting is mentioned as an example of the keystroke method. The consonant method is a way that only a consonant is input for inputting the word. In this method, the same key is assigned to the Japanese syllabary kana which belongs to the same line in a Japanese kana syllabary table.

For example, a key "1" is assigned to the Japanese kana "a", "i", "u", "e", and "o" in order (herein, alphabet is used to explain kana pronunciation), which are in the same "a" line in the Japanese kana syllabary table. In a similar manner, a key "2" is assigned to the "ka" line, a key "3" to the "sa" line, a key "4" to the "ta" line, a key "5" to the "na" line, a key "6" to the "ha" line, a key "7" to the "ma" line, a key "8" to the "ya" line, and a key "0" to the "ra" line. A key "0" is assigned to the Japanese kana "wa", "wo", and "n". For example, to input a Japanese word "konnitiha" which consists of kana "ko", "n", "ni", "ti", and "ha", the keys "2", "0", "5", "4", and "6" of the information specification apparatus 100 are input in order by using the consonant method.

In this input operation, as the first character of the word, one character of "ka" line corresponding to the key "2", as the second character of the word, one character of "wa" line corresponding to the key "0", as the third character of the word, one character of "na" line corresponding to the key "5", as the fourth character of the word, one character of "ta" line corresponding to the key "4", and as the last character of the word, one character of "ha" line corresponding to the key "6", which form the word, are input to the information specification apparatus 100.

As another example for English, the key "2" is assigned to the alphabet "A", "B", and "C". In a similar manner, the key "3" is assigned to the alphabet "D", "E", and "F", the key "4" to the "G", "H", and "I", the key "5" to the "J", "K", and "L", the key "6" to the "M", "N", and "O", the key "7" to the "P", "Q", "R", and "S", the key "8" to the "T", "U", and "V", the key "9" to the "W", "X", "Y", and "Z".

For example, to input a word "ANY" which consists of alphabet "A", "N", and "Y", the keys "2", "6", and "9" of the information specification apparatus 100 are input in order by using the consonant method.

In this input operation, as the first character of the word, one character of the alphabet "A", "B", and "C" corresponding to the key "2", as the second character of the word, one character of the "M", "N", and "O" corresponding to the key "6", and as the last character of the word, one character of the "W", "X", "Y", and "Z" corresponding to the key "9", which form the word, are input to the information specification apparatus 100.

An example in the case of specifying an English word from the specific document of English is described in the following explanation.

In a step S4, the history information of the keystroke input at the step S3 is recorded on a record domain of the information specification apparatus 100. The history information of the keystroke is temporarily saved in the record domain like a memory, when the specification processing of the word is completed, the information is eliminated. Further, in a step S5, a word corresponding to the keystroke history information recorded at the step S4 is selected as the candidate word from the text information in the document specified at the steps S1 and S2.

As an example of the candidate selection method, word information is read in order from the head word of the text information of the specific document, and the candidate word is selected by judging the agreement with the keystroke history information. FIG. 8 illustrates an example of a selection method of candidate words. An example of the selection method of candidate words is explained with reference to FIG. 8.

If the keystroke history information is "2", "6", and "9" at the step S4, in the step S5, the word information which has the character of A, B, and C at the head corresponding to the "2" key is detected from the text information, and it is temporarily saved in the record domain as the candidate words.

Further, the word information which has the character of M, N, and O at the second corresponding to the key of "6" is detected from the candidate words saved in the record domain temporarily, and the detected candidate words are temporarily saved in the record domain again.

Furthermore, the word information which has the character of W, X, Y, and Z at the last corresponding to the key of "9" is detected from the candidate words saved in the record domain temporarily, and the detected candidate words are temporarily saved in the record domain again. The keystroke history information and the candidate word group corresponding to it are selected from the text information of the specific document by repeating and performing the above-mentioned processing, .

In a step S6, the candidate words selected at the step S5 is displayed on the image output part 106 of the information specification apparatus 100. FIG. 9 illustrates an example of the screen which displays the candidate words. In the example of the screen shown in FIG. 9, the candidate words selected are displayed in a case that the text information in the document (document as the specification object of the word) is specified at the steps S1 and S2 shown as text information in the lower part of FIG. 9.

In this example, when the keystroke history information at the step S4 is "2", 16 candidate words are displayed. When the keystroke history information is "2" and "6", nine candidate words are displayed. When the keystroke history information is "2", "6", and "9", one candidate word is displayed. In addition, when all candidate words cannot be displayed on the screen, a user's screen-scrolling operation (not shown) may be used to display the remaining candidate words which cannot be displayed at first.

In a step S7, the word which should be specified is selected from the candidate words displayed at the step S6 by using a cross key etc. in the keystroke part. The selecting processing of the candidate word may be done at any time, and the user selects the candidate word using the cross key etc., when the user recognizes it is easy to select the word with reference to the number of candidate words displayed at the step S6. When the user selects the candidate word at the step S7, the process steps forward to a step S8. When the user does not select the candidate word, but keystroke-inputs the word in the keystroke part, the process steps forward to the step S3, the processing of the steps S3-S7 is repeated.

At a step S8, the word information chosen from two or more candidate words at the step S7 is fixed as word information which the user wants to specify, and then, processing is ended. Even if using the information specification apparatus 100 which has the small number of keys of the keystroke part like a personal digital assistant, the information specification apparatus 100 which can easily specify the word in the document may be offered with performing the whole processing of the flowchart.

Although the candidate words are displayed in the order of selecting them from the head of the text information in the document as shown in FIG. 9, as another method, the priority of the candidate word may be computed and they may be displayed in the order of the priority. A various kinds of the priority may be chosen, for example, word length, the number of the user's keystrokes, etc.

When the number of the candidate words selected at the step S5 is one, the word selected at the step S5 may be determined as the word which the user wants to specify without performing processing of the steps S6 and S7. When there are two or more selected candidate words, the priority of the candidate word may be calculated and the candidate word with the highest priority may be determined as the word which the user wants to specify.

Further, although the candidate words are displayed on the screen of the information specification apparatus 100 in the example of FIG. 9, voice output may be carried out using the voice response part 103 of the information specification apparatus 100, or a screen display and a phonological representation may be carried out using another device. In the example of the step S7, the user chooses the word to be specified from the candidate words using the keystroke part 101 of the information specification apparatus 100, as another example, the word to be specified may be chosen by using the audio input part 102 of the information specification apparatus 100 with a sound.

Figure 10:
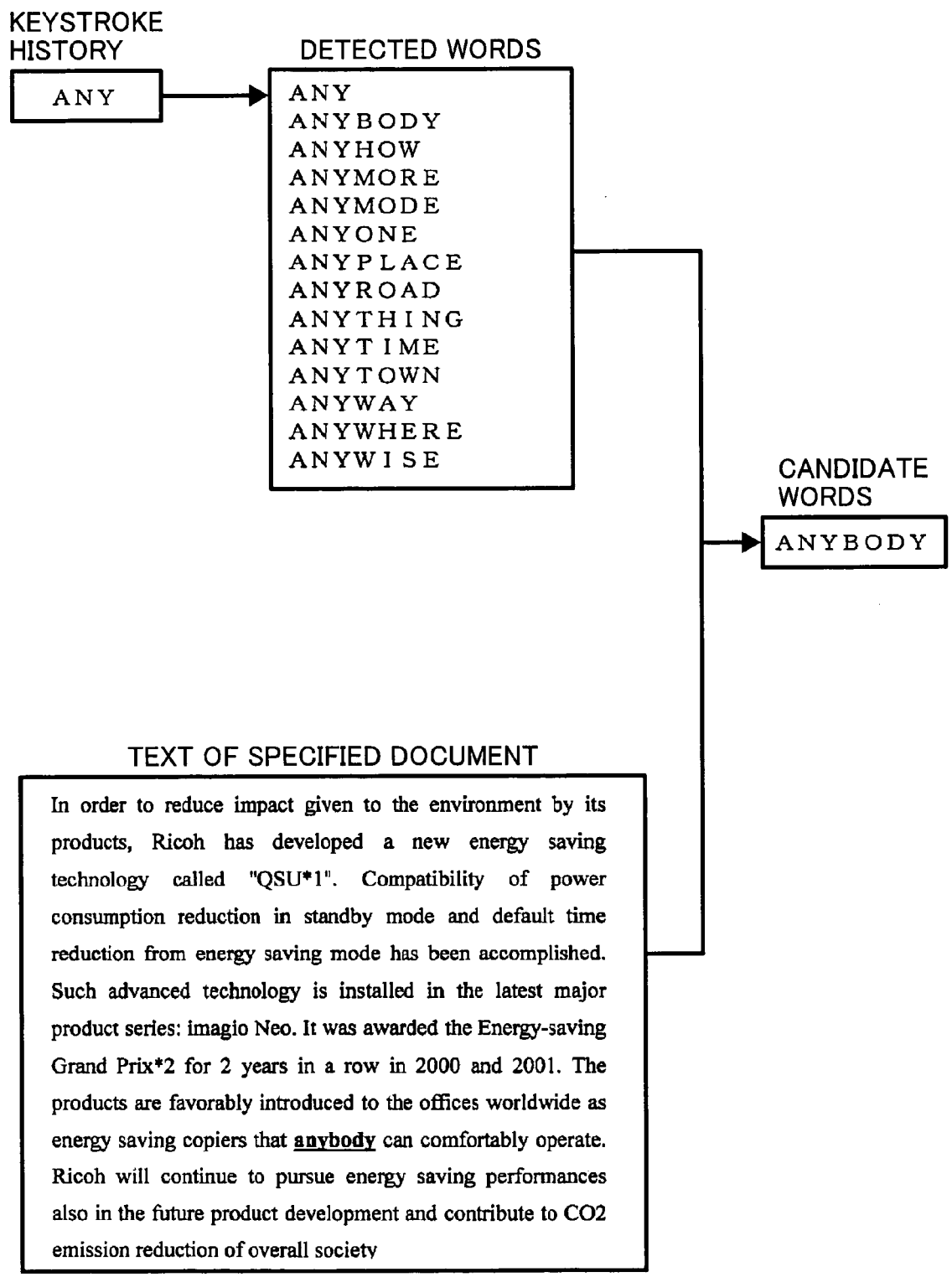
FIG. 10 illustrates an example of a method of keystroke of the character string to select the candidate words.

As an example of the keystroke method of the step S3, a consonant method is used, and also as another example, a usual method of keystroke of the character string may be used as shown in FIG. 10. FIG. 10 illustrates an example of a method of keystroke of the character string to select the candidate words. This usual method of keystroke of the character string means a method of inputting a character string based on specifying a function from two or more functions assigned to the key by inputting continuously the same key.

For example, the key "2" is assigned to the alphabet "A", "B", and "C". In a similar manner, the key "3" is assigned to the alphabet "D", "E", and "F", the key "4" to the "G", "H", and "I", the key "5" to the "J", "K", and "L", the key "6" to the "M", "N", and "O", the key "7" to the "P", "Q", "R", and "S", the key "8" to the "T", "U", and "V", the key "9" to the "W", "X", "Y", and "Z".

To specify a word "ANY" in the document, pushing the key "2" once for selecting "A", pushing the key "6" twice for selecting "N", and pushing the key "9" three times for selecting "Y", like this, the character string may be input.

This usual character string input method is generally known, and its number of times of keystroke is greater, so it is complicate for inputting the character string. On the other hand, the consonant method as the input method is almost not known, as compared with the usual character string input method, its number of times of keystroke is smaller, so it is easy for inputting the character string. Then, in the step 3, setting up the user's preferable method in the information specification apparatus 100 beforehand makes it possible to select from the above-mentioned methods.

When the usual character input method is used, as an example of the candidate words selecting method, a method of judging whether word information is in agreement with keystroke history information in the order of reading from the head word in the specific document is known. This method enables to input more detailed information than the consonant method, selecting accuracy of the candidate words becomes high.

As another example of selecting the candidate words, after detecting a word group suggested from keystroke history information with a word dictionary, a method of selecting the word information as candidate words which is in agreement with the word group of the text information in the specified document is mentioned.

FIG. 10 illustrates this example. In this FIG. 10, selecting candidate words when the keystroke history information at the step S4 of FIG. 7 is recorded as "ANY" is performed. That is, in that case, word dictionary information is recorded on the recording part of the information specification apparatus 100 beforehand, and a word group including keystroke history information is detected from the word dictionary. As an example of the word group detected from the word dictionary information when the keystroke history information is "ANY", ANY, ANYBODY, ANYHOW, ANYMORE, ANYMODE, ANYONE, ANYPLACE, ANYROAD, ANYTHING, ANYTIME, ANYTOWN, ANYWAY, ANYWHERE, and ANYWISE are selected.

When selecting the word from the text information in the document acquired at the steps S1 and S2, the word ANYBODY is selected. Selecting the candidate words can be performed by the above processing. In addition, the word dictionary information used for detecting a word group is recorded on outboard recorders other than the information specification apparatus 100, and word dictionary information may be used by communications between the information specification apparatus 100 and the outboard recorder.

Figure 11:
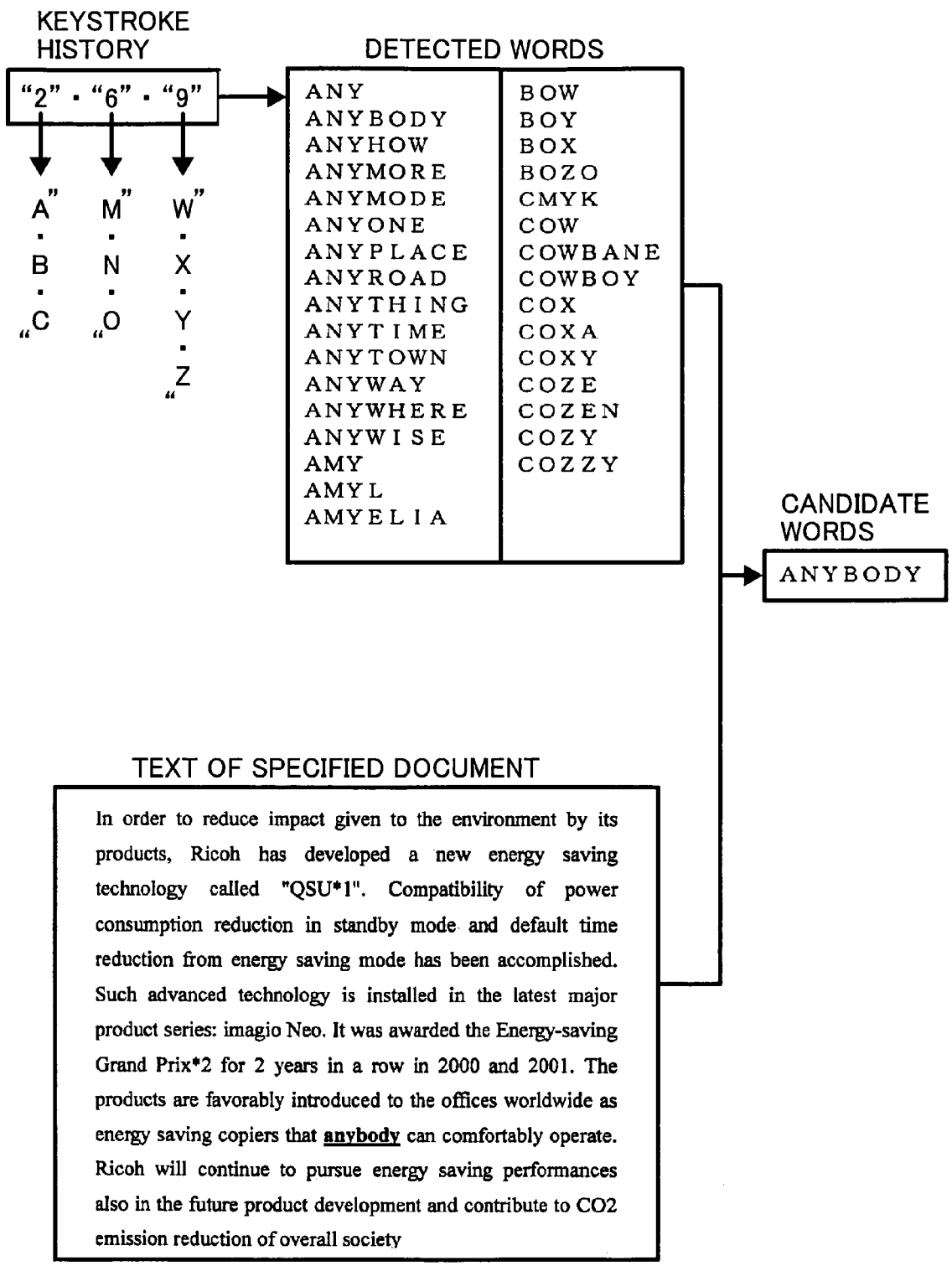
FIG. 11 illustrates an example of selecting the candidate words in a case that the keystroke history information at the step S4 of FIG. 7.

Further, when using the consonant inputting method at the step S3, the above-mentioned selecting method of the candidate words may be applied. FIG. 11 illustrates an example of selecting the candidate words in a case that the keystroke history information at the step S4 of FIG. 7 records the key of "2", "6", and "9" in order. The word group detected from the keystroke history information and the word dictionary information is the word group which starts a character as any of "A, B, C", the 2nd character as any of "M, N, O", and the 3rd character as any of "W, X, Y, Z."

In this case, the number of words detected is naturally increased than the usual character inputting method, ANY, ANYBODY, ANYHOW, ANYMORE, ANYMODE, ANYONE, ANYPLACE, ANYROAD, ANYTHING, ANYTIME, ANYTOWN, ANYWAY, ANYWHERE, and ANYWISE, in addition, AMY, AMYL, AMYELIA, BOW, BOY and BOX, BOZO, COW, COWBANE, COX, and COXY are detected as a word group from the keystroke history information.

Applying condition of the detected word group to the text information in the document acquired at the steps S1 and S2 selects only ANYBODY. Thus, even if the number of words detected from the word dictionary information for the character inputting by the consonant method increases, it is possible to lessen the number of candidate words to select by limiting the candidate words in the text information of the document.

Further, for example, when specifying the word using text information of the society paper magazine (about four copies in A4 size: about number of words 2000-3000) of a computer science system by the consonant method, it is recognized that performing 3-4 keystrokes (inputting 3-4 consonants) almost always causes the number of candidate words to be ten or less, then, it is possible to display all candidate word groups on the display of a cellular-phone machine etc.

Before selecting the candidate words, stemming processing which identify different expressions of the word (example: BOOK and BOOKS are in the same category), may be executed. After normalizing the text information of the document like this, the selecting processing of the candidate words may be performed. In above example, it explains about English text information. In a case of Japanese sentences, which do not have a blank between words like English, as pre-processing of selecting candidate words, morphological-analysis processing and processing of dividing the Japanese sentences into words may be added. The morphological-analysis processing of Japanese sentences may be performed using software, such as Chasen.

When a Chinese character is included in the Japanese sentence, after performing a Chinese character Japanese-syllabary conversion process and changing into a Japanese-syllabary character, selecting processing of the candidate words may be performed. In the above method, the sentences are divided into words, but the unit is not limited only a word, for example, a clause, a sentence, and a paragraph may be a unit for dividing the text information, and then, candidates may be selected.

FIG. 12 is a flowchart of a detailed example of a document specification processing indicated as the steps S1 and S2 in the FIG. 7 in which the paper document 500 including the code information 501 is specified using the information specification apparatus 100 in FIG. 1. In the FIG. 12, the electronic document corresponding to the paper document 500 is saved in the documentation management database 401 in the external server 400, and the figure explains the document specification processing in case that the information specification apparatus 100 acquires the text information corresponding to the document from the external server 400.

At a step S11 in FIG. 12, the code information 501 printed on the paper document 500 is captured with the image input part 105 installed in the information specification apparatus 100, and image information of the code information 501 is acquired. An example of the paper document including the code information 501 is printed as shown in FIG. 2, and the example includes a two dimension code in the paper document as the code information 501. The two dimension code is printed at the upper left of the paper document 500 in the example of FIG. 2, but any position may be possible to print as long as the two dimension code can be captured with the image input part 105 of the information specification apparatus 100.

The two dimension code is printed on the specified document in FIG. 2, the two dimension codes may be printed for each page or every chapter of the document, and a part of the document may be specified using the code information 501. A QR code form may be used as an example of the two dimension code. Even if image distortion etc. occurs when capturing the two dimension code because the image pick-up side of the image input part 105 of the information specification apparatus 100 and the paper document 500 are not parallel, compensation processing to the distorted image may be performed and analysis processing of the two dimension code may be easily carried out.

In a step S12, the code information 501 as two dimension code is extracted from the image information captured at the step S11. The example of this code information is shown in FIG. 3, and the explanation is as above-mentioned.

In a step S13, with reference to URL information, which shows the place of the external server 400, acquired by the information specification apparatus 100 at the step S12, the information specification apparatus 100 performs communicating processing with the external server 400 and transmitting the place information specifying the electronic document acquired at the step S12.

In a step S14, the external server 400 detects the electronic document saved in the documentation management database 401 in the external server 400 with reference to the place information which specifies the electronic document transmitted from the information specification apparatus 100, and transmits the text information of the electronic document to the information specification apparatus 100. In addition, the external server 400 may perform the morphological-analysis processing, the stemming processing, etc. to the text information.

In a step S15, the information specification apparatus 100 receives the text information transmitted from the external server 400, and records the text information on the record domain of the information specification apparatus 100.

The document specification processing as a pre-processing of a whole flowchart shown in FIG. 7 may be performed by performing the above processing. FIG. 13 illustrates an example of a documentation management database. In the documentation management database, the code information 501 printed on the paper document 500 and the electronic document information corresponding to the paper document 500 are associated and saved, and the electronic document information corresponding to the paper document 500 may be acquired by referring to the code information 501 printed on the paper document 500.

According to the information specification system, the information specification method, the server equipment, the information specification apparatus, and the information specification program of this invention, for example, when a document and a personal digital assistant are distributed, and the word information in this document is specified, the word information from a personal digital assistant may be easily specified for this specified document by using the personal digital assistant and specifying the document. Thus, it is possible to boot arbitrary applications, such as a dictionary function, a search service, and an edit function, using the specified word information.

The flowchart of the above-mentioned document specification processing indicates the example which performs the document specification processing by acquiring the code information added to the paper document. In addition, the document specification sign information may be printed on the paper document for specifying the document, such as a document number and a document title name, and the document may be specified as the specification object of the word by the user's keystroke of the document specification sign information with the keystroke part 101 of the information specification apparatus 100. Further, the title name of the document group registered into the external server may be displayed on the screen of the information specification apparatus 100, and the user may choose the document which is the specification object of the word.

In the embodiment of FIG. 2, the two dimension code printed as the code information is used, in addition, small chips, such as RF-ID, may be printed instead of a bar code, and the document may be specified by acquiring the code information on the small chip using the tag reading function installed in the information specification apparatus 100. As another example, the tag reading function may be installed in the external equipment around the information specification apparatus 100, and the document may be specified by acquiring the code information.

Since the contents of the document in books which the user uses, such as English teaching materials, forms the same order as using, the document, which the user uses, may be automatically specified by changing the document as the teaching materials. Further, this invention is not limited to using the paper document mentioned above, if the text information of the document can be acquired by specifying the document which is specification object of the word, this invention is applicable to the document of any forms.

The above-mentioned flowchart described the embodiment which performs the document specification processing using the external server other than the information specification equipment 100. As another application of this invention, inserting the text information of the document into the code information and performing all processings with the information specification apparatus 100 without using the external server etc. may be possible by storing the text information in the arbitrary memory equipment which can be detached and attached to the information specification apparatus 100, distributing this memory equipment with the paper document, and transmitting and saving the text information beforehand into the memory equipment at the information recording part of the information specification apparatus 100.

Next, another example is described. In this example, other arbitrary applications are booted by the word specified in the before example. In the following explanation, the example of the information specification apparatus 100 which realizes application acquiring the semantic information of a word and is output to the screen of the information specification apparatus 100 is described.

Figure 14:
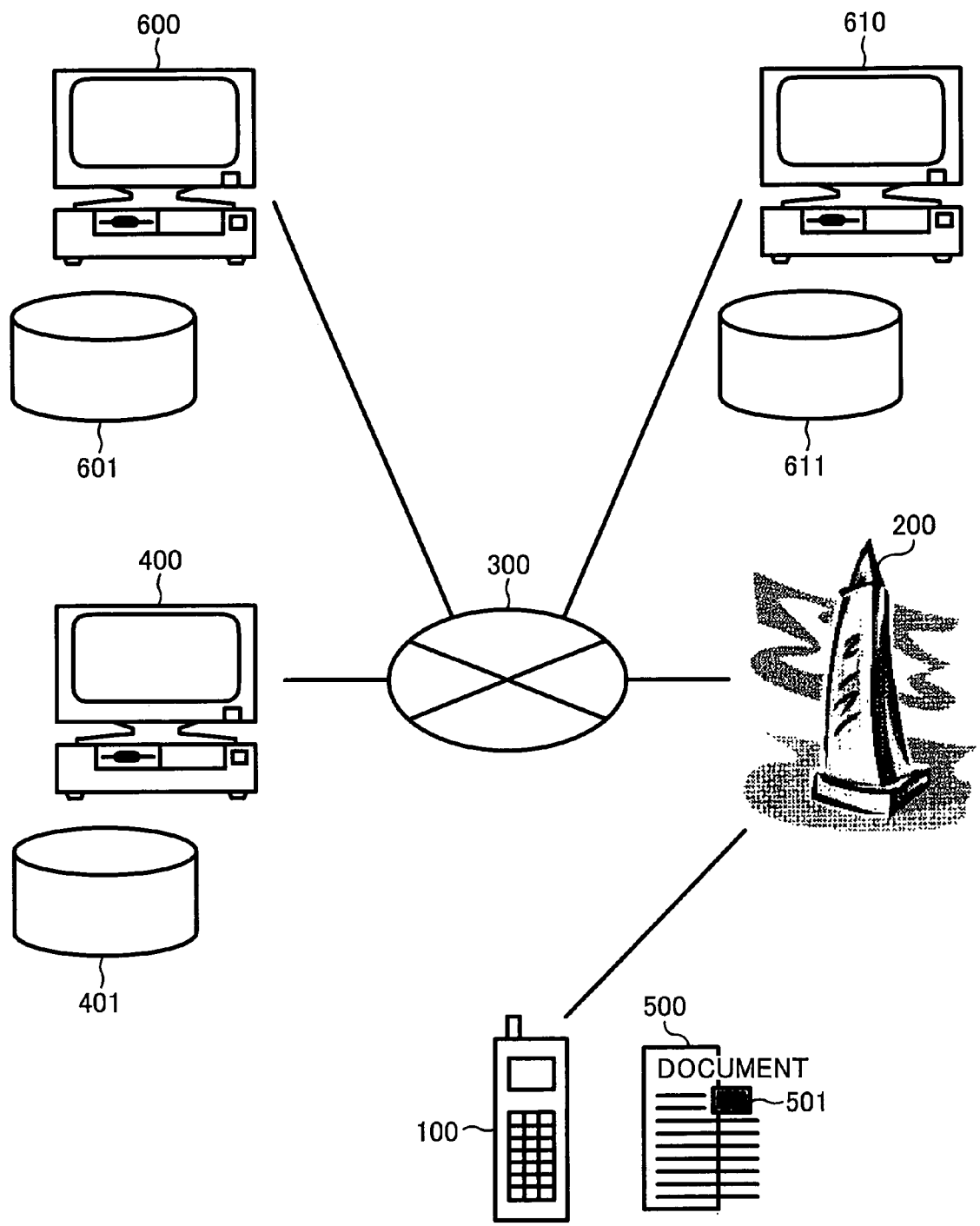
FIG. 14 illustrates an example system configuration of an information specification system according to another embodiment of the present invention.

FIG. 14 illustrates a system configuration of the information specification apparatus 100 according to an embodiment of the invention. In FIG. 14, an example of a system in which the information specification equipment 100 performs communications processing with an external server managing a document using the Internet etc. through a base station of a personal digital assistant and a dictionary server having the word dictionary database of semantic information is described. That is, in FIG. 14, dictionary servers 600 and 610 are further connected to the communications network 300 of the system configuration of FIG. 1. Word dictionary databases 601 and 611 are prepared for these dictionary servers 600 and 610.

The external server 400 and the dictionary servers 600 and 610 which manage the document may be installed separately, and each server may have its own administrator respectively. Further, two or more dictionary servers may be installed, and the semantic information of the word may be acquired after selecting the dictionary server which can communicate according to the contents of the meaning of the word. In this example, the word information and the semantic information of the word are associated and saved in the word dictionary database which can acquire the semantic information of the word with reference to the word information.

Figure 15:
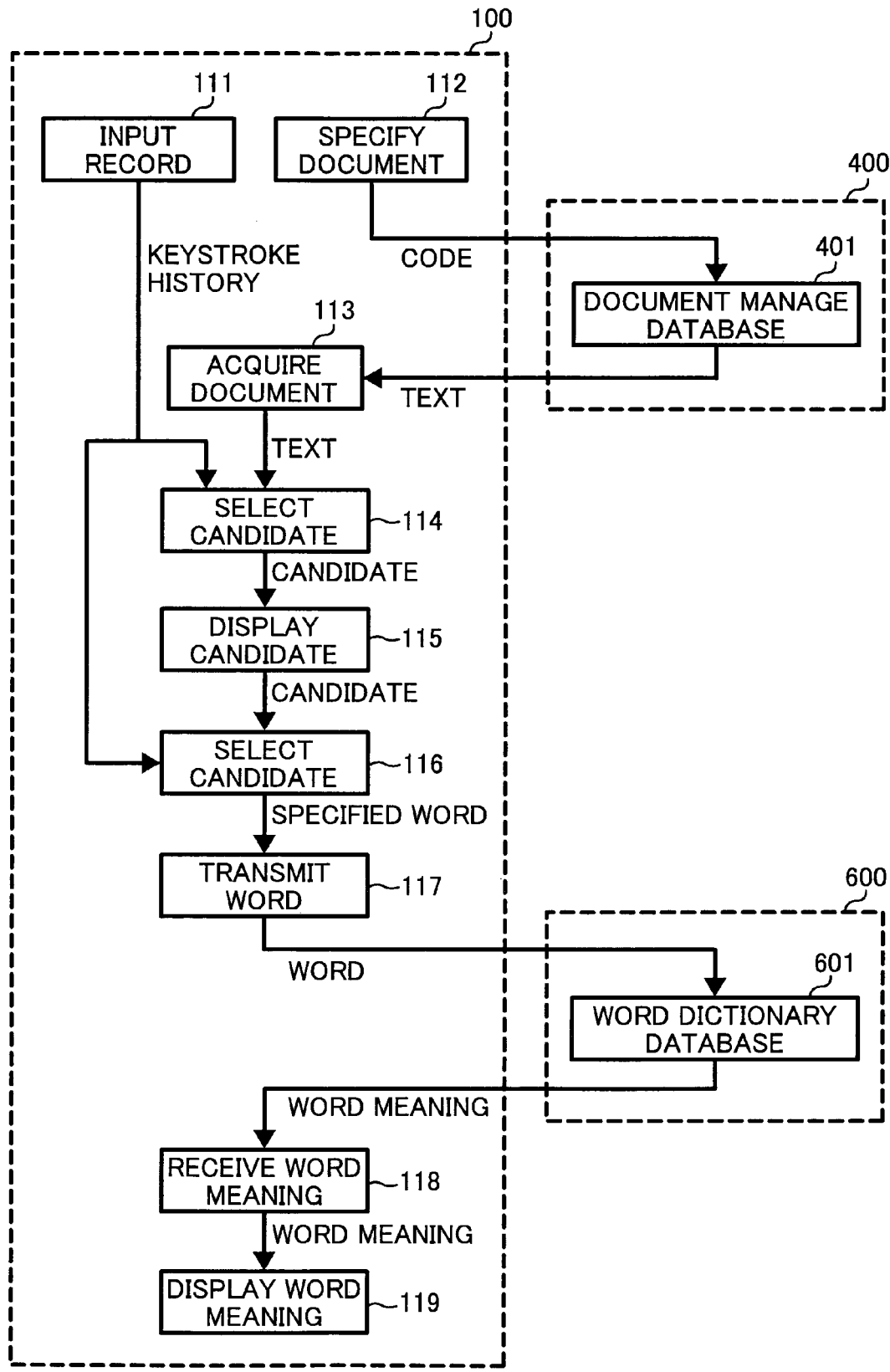
FIG. 15 illustrates an example of a functional block diagram of an information specification apparatus used in the information specification system of FIG. 1.

FIG. 15 illustrates an example of a functional block diagram of the information specification apparatus 100. In this FIG. 15, the input recorder 111 of the information specification apparatus 100, the document specification mechanism 112, the document information communication acquisition mechanism 113, the candidate information selector 114, the candidate information display 115, the candidate information selector 116, and the documentation management database 401 of the external server 400 have the same configuration as the form in FIG. 5.

In the functional block diagram of FIG. 15, the word information chosen by the candidate information selector 116 is passed to the word transmitter 117. This word transmitter 117 is a mechanism to transmit the word information chosen with the candidate information selector 116 to the dictionary server 600, and the transmitting processing is performed through the communication part 104 of the information specification apparatus 100. The word dictionary database 601 is searched by the dictionary server 600 according to the received word information, and the dictionary server 600 sends a reply such as a meaning of the corresponding word to the information specification apparatus 100.

The word meaning information receiver 118 is a mechanism to receive the semantic information of the word transmitted by the dictionary server 600, and transmitting processing is performed through the communication part 104 of the information specification apparatus 100 like the word transmitter 117. The received semantic information is passed to the word meaning information display 119, and the word meaning information display 119 displays the semantic information of the word received with the word meaning information receiver 118 on the image output part 106 of the information specification apparatus 100. Thus, the application which outputs the semantic information of the word to the screen of the information specification apparatus 100 may be realized.

Figures 16, 17:
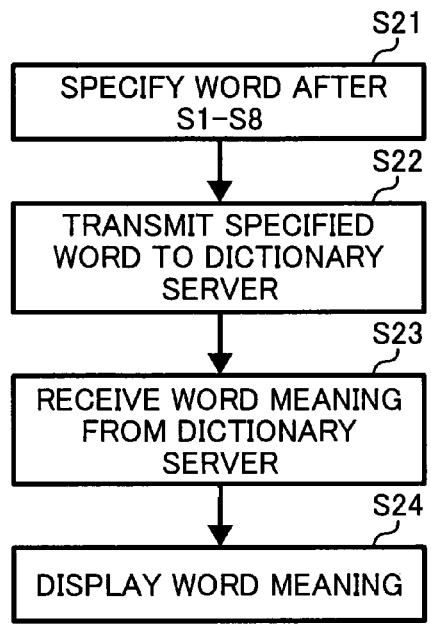
FIG. 16 illustrates a flowchart of semantic information display processing of a word.
FIG. 17 illustrates an example of code information including a dictionary server's URL information in FIG. 14.

FIG. 16 illustrates a flowchart of semantic information display processing of a word. In a step S21 of this FIG. 16, after the same processing as the steps S1-S8, a word which should be inquired for semantic information may be specified from the document.

In a step S22, the word information specified at the step S21 is transmitted to the dictionary server 600. When word specification is carried out, word information transmitting to the dictionary server 600 may be performed automatically after setting the dictionary server's 600 URL information to the information specification apparatus 100. In another way, the user may choose the dictionary servers 600 and 610 according to the word dictionary databases 601 and 611 which the user wants to use, and the word information may be transmitted.

The URL information of the dictionary server 600 may be recorded on the code information 501 printed in the paper document 500 beforehand, and the word information may be transmitted. In another way, the dictionary server's 600 URL information may be registered into the external server 400 which manages the document, and the information specification apparatus 100 may transmit the word information to the dictionary server 600 via the external server 400.

FIG. 17 illustrates an example of the code information 501 in which the dictionary server's 600 URL information is recorded. In FIG. 17, code information is described by tag format language, such as XML. The dictionary server's 600 URL information is described in a <Dictionary> tag in a <Document Attribute> tag in FIG. 17. With reference to the URL information, the information specification apparatus 100 may transmit the specified word information to the dictionary server.

Further, in a step S23, the dictionary server 600 receives the word information transmitted from the information specification apparatus 100, and detects the semantic information of the word corresponding to the word information received from the word dictionary database 601 in the dictionary server, and transmits the semantic information of the word to the information specification apparatus 100. In a step S24, the word's semantic information from the dictionary server is received, and the semantic information of the word is displayed on the screen of the image output part 106 of the information specification apparatus 100. For example, the specified word may be displayed on the top part of the screen, and the semantic information of the word may be displayed below the word.

A way of displaying is not be limited to above example, the user may preferably change the display layout, for example, the word information may not be displayed but the semantic information of the word may be displayed on the whole screen.

In the above-mentioned example, the semantic information of the word is saved in the word dictionary database in the dictionary server. In another example, the semantic information of the word may be saved as a simple version, in which the amount of data is reduced, into the record domain of the information specification apparatus 100. During specification processing of a word, when the information specification apparatus 100 displays the selected candidate words on the screen, the semantic information of the word as the simple version may also be displayed simultaneously. Further, the semantic information of the word is displayed on the screen in the above-mentioned example using the image output part, the semantic information may be output by voice playback through a voice response part.

The semantic information of the word specified with the embodiment may be acquired, and it may be output to the screen of the information specification apparatus 100 by performing the above processing. In the above-mentioned example, the specified semantic information of the word is output by performing communications processing with the dictionary server. In another example, communications processing with a searching server may be performed, and search processing may also be performed with the specified word as a search key, and the search results may be displayed on the screen of the information specification apparatus 100. Further, in such the searching server, since API for searching WEB (application programming interface) may be exhibited, such services may also be used.

Figure 18:
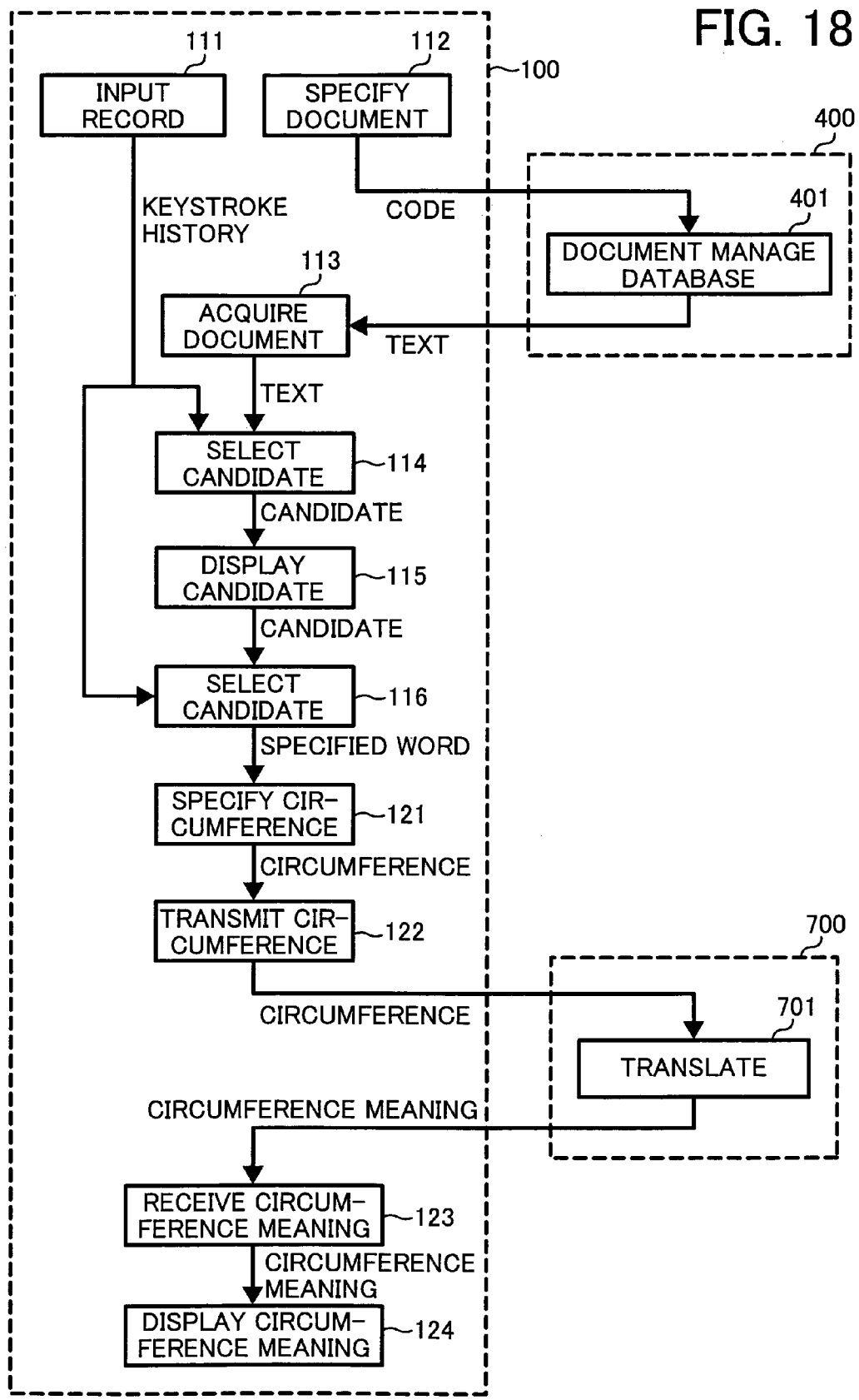
FIG. 18 illustrates a block diagram of the information specification apparatus which performs translation processing.

The specified semantic information of the word may be acquired in the above-mentioned example. In another example which uses the circumference word information of the specified word, the semantic information on one sentence which contains the specified word may be output to the screen of the information specification apparatus 100. FIG. 18 illustrates a functional block diagram of the information specification apparatus 100 which performs such translation processing of one sentence.

In this FIG. 18, the input recorder 111 of the information specification apparatus 100, the document specification mechanism 112, the document information communication acquisition mechanism 113, the candidate information selector 114, the candidate information display 115, the candidate information selector 116, and the documentation management database 401 of the external server 400 have the same configuration as the form of in FIG. 5.

The word information chosen by the candidate information selector 116 is passed to a circumference word information specification mechanism 121 in the functional block diagram of FIG. 18. This circumference word information specification mechanism 121 is a mechanism to specify one sentence (circumference word information), which becomes a candidate for translation, from the specified word. As the specific method of this circumference word information, one sentence which includes the specified word may be specified as the candidate for translation. In another example, the circumference word information of the specified word may be output to the screen of the information specification apparatus 100, and the user may choose one sentence as the candidate for translation.

Further, the circumference word information specification mechanism 121 sends the specified circumference word information to a circumference word information transmitter 122. This circumference word information transmitter 122 is a mechanism to transmit the document information of one sentence specified with the circumference word information specification mechanism 121 to a translation server 700. The transmitting processing is performed through the communicating part 104 of the information specification apparatus 100. In the translation server 700, document information is translated with an internal translation processor 701, and the result is sent to the information specification apparatus 100.

A circumference word meaning information receiver 123 is a mechanism to receive the translation processing result (semantic information on the circumference word) of one sentence transmitted by the translation server. The transmitting processing is performed through the communicating part 104 of the information specification apparatus 100 like the circumference word information transmitter 122. Further, a circumference word meaning information display 124 displays the translation processing result received with the circumference word meaning information receiver 123 on the image output part 106 of the information specification apparatus 100.

FIG. 19 illustrates an example as selecting one sentence which includes the specified word "ANYBODY" from the specified document. In addition, translation processing of the sentence may be performed from the selected document information of one sentence. Further, the translation processing may be performed by using the circumference information of the one sentence.

In a case that one sentence including the specified word is selected and just translated, for example, "the products" is just translated to "the products" without no name. But, if the circumference information has the name of "the products", "Imagio Neo (registered trademark)", "the products" may be translated to "Imagio Neo" by using the circumference information of the one sentence. Thus, in this example, since a word is specified by specifying a document without inputting the word, application of circumference information of the specified may be possible.

Figure 20:
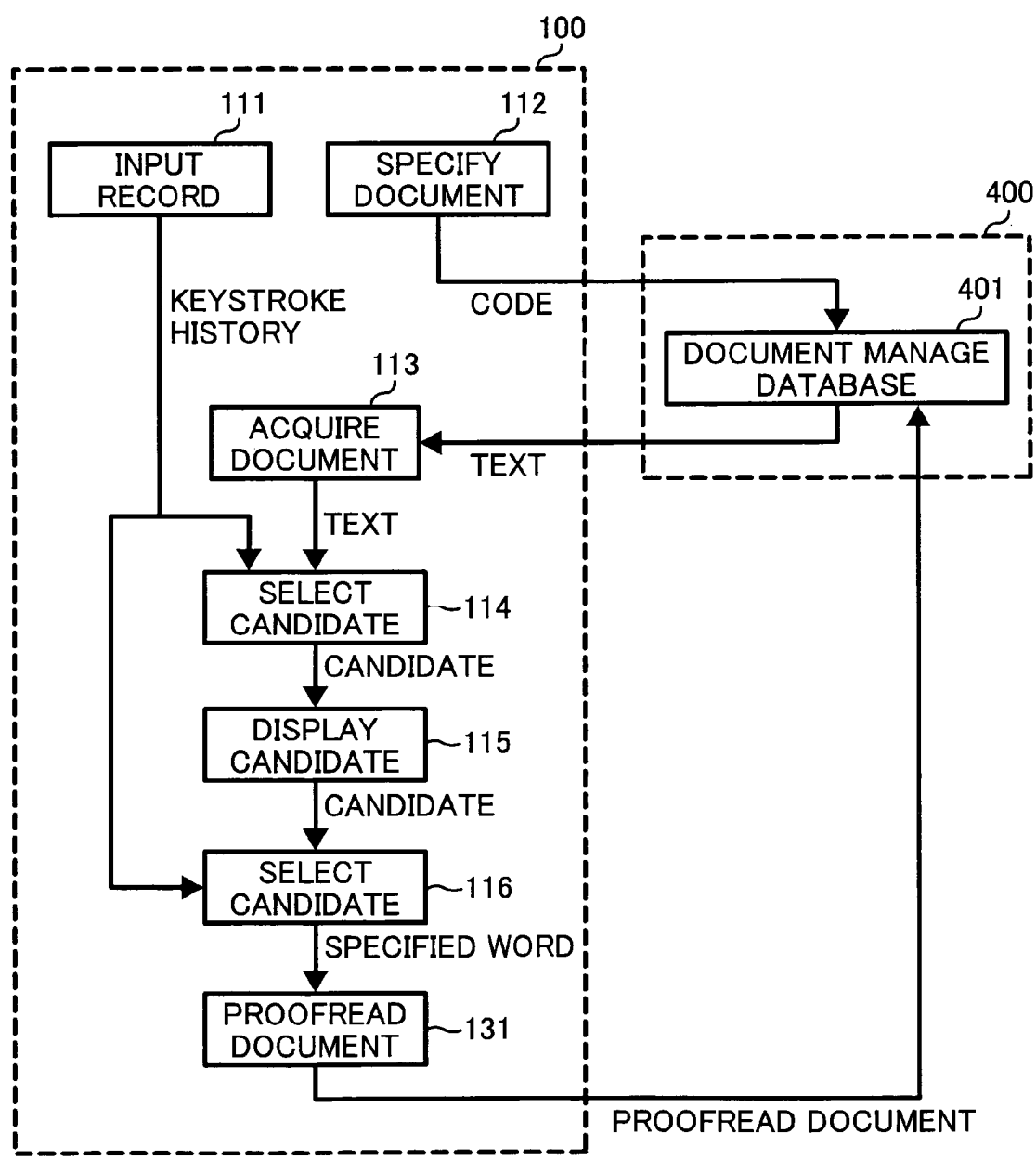
FIG. 20 illustrates a block diagram of the information specification apparatus which performs document proofreading.

FIG. 20 illustrates a block diagram of the information specification apparatus 100 which performs document proofreading of the specified word or the circumference portion of the word.

In this FIG. 20, the input recorder 111 of the information specification apparatus 100, the document specification mechanism 112, the document information communication acquisition mechanism 113, the candidate information selector 114, the candidate information display 115, the candidate information selector 116, and the documentation management database 401 of the external server 400 have the same configuration as the form of in FIG. 5.

The word information chosen by the candidate information selector 116 is passed to a document proofreading mechanism 131 in the functional block diagram of FIG. 20. The document proofreading mechanism 131 is a mechanism to proofread the document information of the circumference portion of the word information chosen with the candidate information selector 116. When the document proofreading is carried out, the document proofreading information is transmitted to the external server 400 through the communicating part 104 of the information specification apparatus 100, and the electronic document saved in the documentation management database 401 may be changed.

Figure 21:
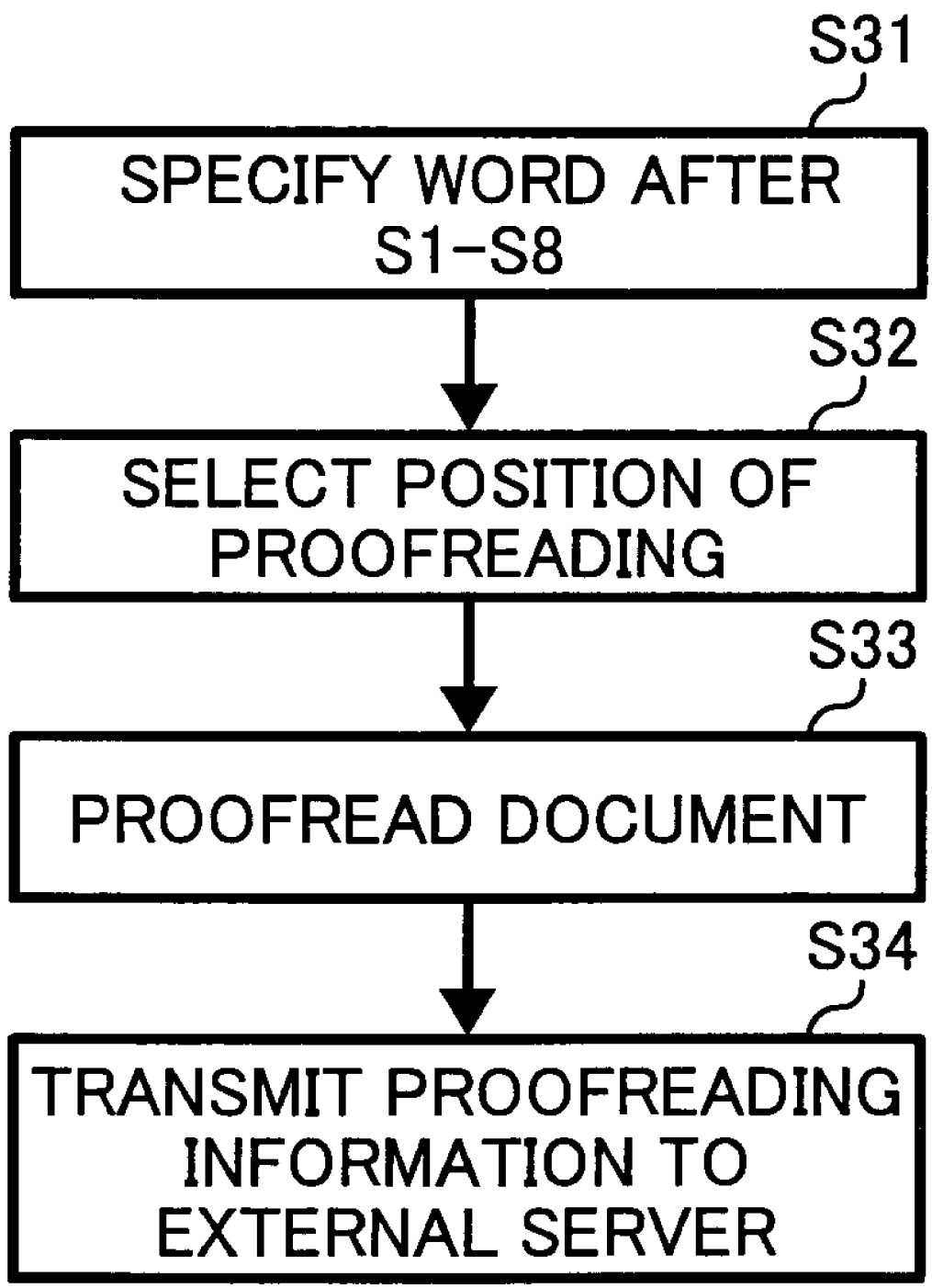
FIG. 21 illustrates a flowchart of proofreading processing of document.
Figure 22:
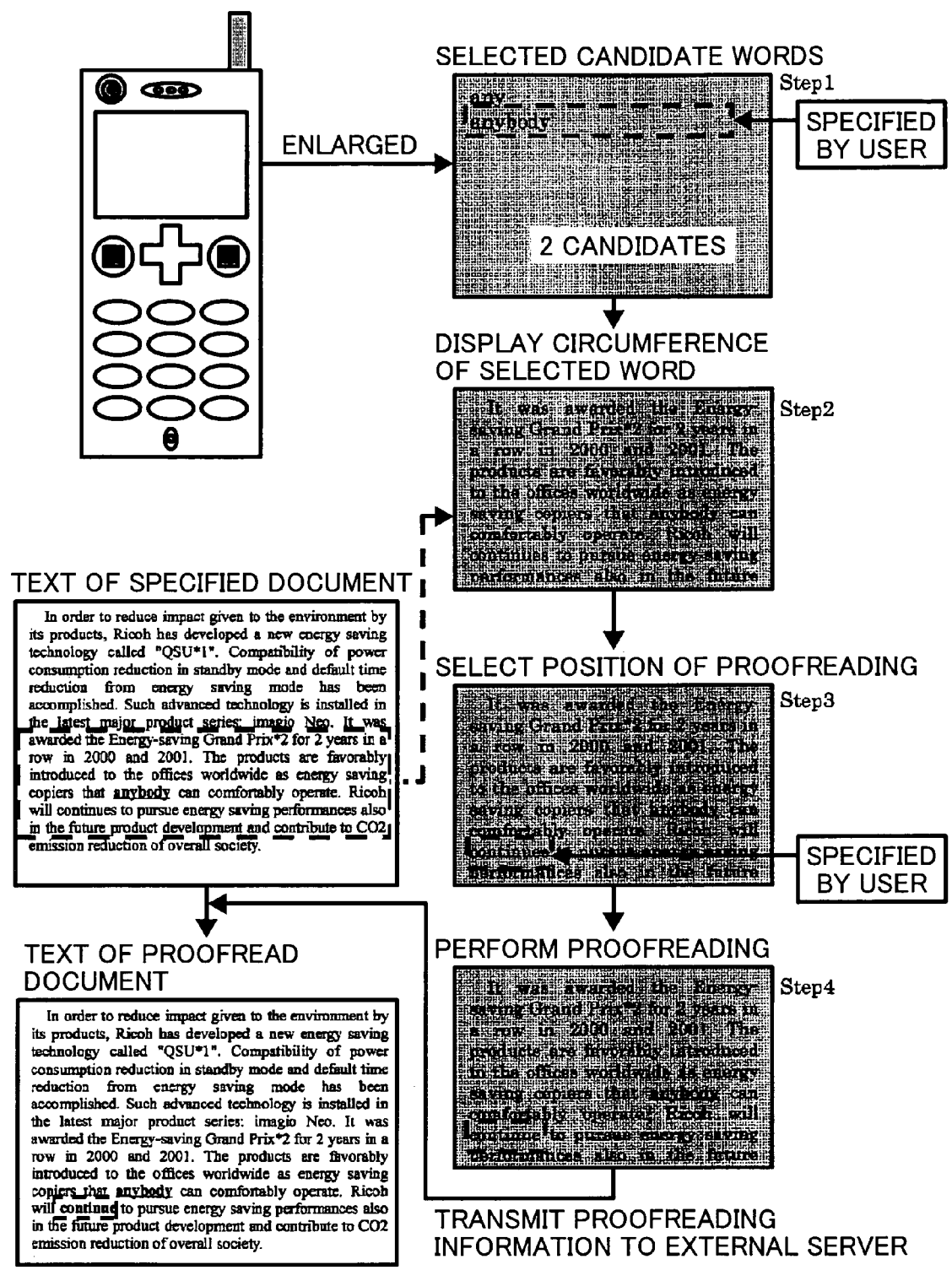
FIG. 22 illustrates an example of a screen display of the information specification apparatus under the flowchart processing in FIG. 21.

FIG. 21 illustrates a flowchart of proofreading processing of document. FIG. 22 illustrates an example of a screen display of the information specification apparatus 100 under the flowchart processing in FIG. 21. In a step S31 of this FIG. 21, after the same processing as the steps S1-S8, a word may be specified to perform proofreading processing around the word in the document.

In a step S32, a document position where it should be performed proofreading processing is selected from the position of the specified word at the step S31. As an example of selecting method of the document position, with displaying the circumference word information of the specified word, the document position for proofreading processing may be selected by using a cross key of an input recorder etc. Since the position, where proofreading processing is performed, may be selected from the position of the specified word, selecting operation may be simply performed than the usual method of choosing a position of document.

In a step S33, document information around the document position chosen at the step S32 may be proofread. As a proofreading processing method of a document, the method of inputting a character to proofread with the input recorder 111 of the information specification apparatus 100, or the method of carrying out the audio input of the character for proofreading through the audio input part 102 of the information specification apparatus 100 may be performed.

In a step S34, difference information between the document information proofread at step S33 and the document information before proofreading is generated as document proofreading information, and the document proofreading information is transmitted to the external server 400. The external server 400 acquires the document proofreading information transmitted from the information specification apparatus 100, and performs proofreading processing of the document saved in the documentation management database 401 in the external server 400 with reference to the acquired document proofreading information. Thus, the information specification apparatus 100 which can execute application of document proofreading processing of a word or a circumference portion of the word may be offered.

Figure 23:
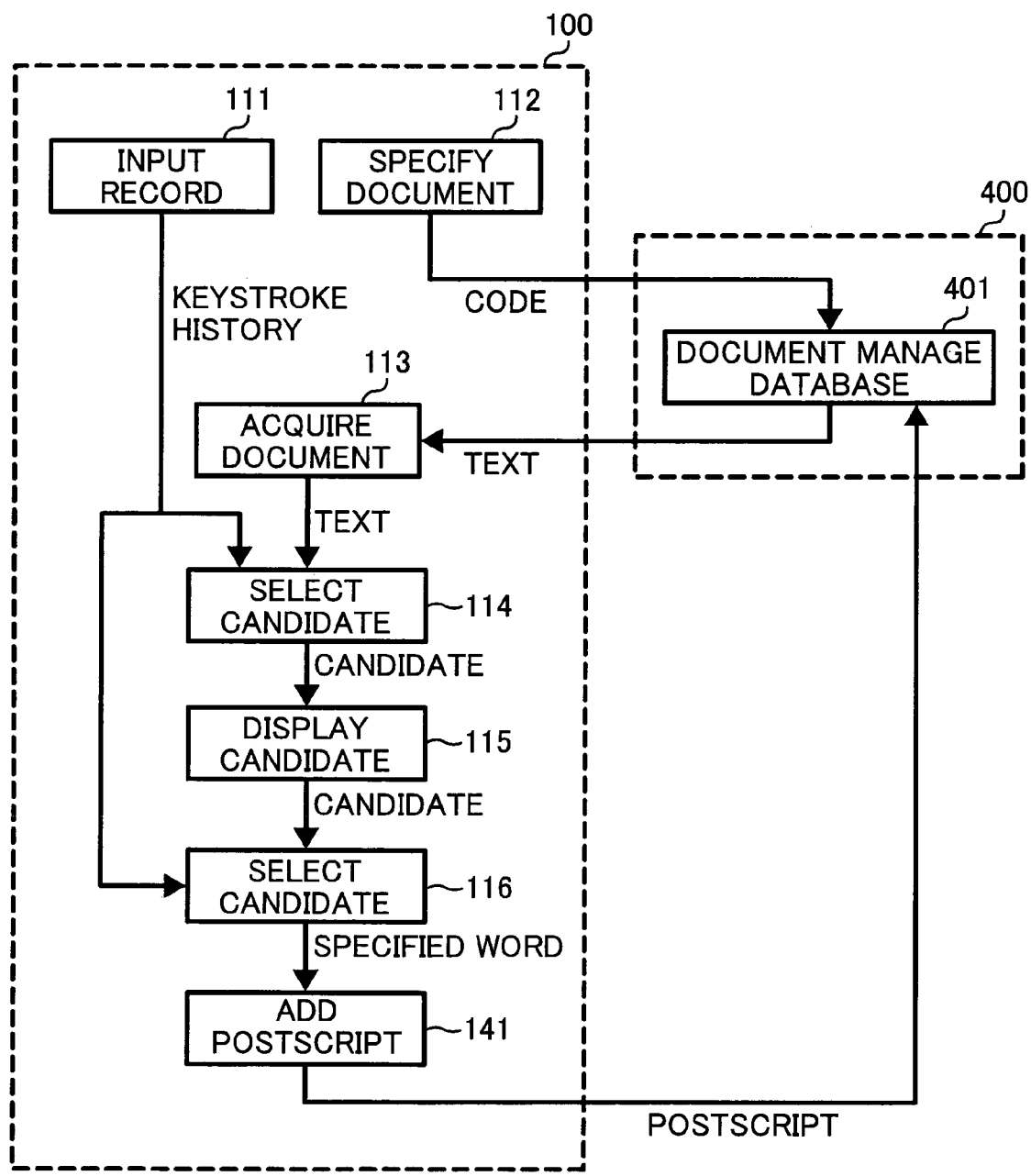
FIG. 23 illustrates a block diagram of an example of the information specification apparatus which may add postscript information.

FIG. 23 illustrates a functional block diagram of the information specification apparatus 100 which may add postscript information to a word or a circumference portion of the word.

In this FIG. 23, the input recorder 111 of the information specification apparatus 100, the document specification mechanism 112, the document information communication acquisition mechanism 113, the candidate information selector 114, the candidate information display 115, the candidate information selector 116, and the documentation management database 401 of the external server 400 have the same configuration as the form in FIG. 5.

The word information chosen by the candidate information selector 116 is passed to a document postscript mechanism 141 in the functional block diagram of FIG. 23. The document postscript mechanism 141 is a mechanism to add postscript information, such as character string information, voice information, and image information, to the document position in the circumference portion of the word information chosen with the candidate information selector 116. The postscript information is transmitted to the external server 400 through the communicating part 104 of the information specification apparatus 100, and the electronic document saved in the documentation management database 401 may be changed.

Figure 24:
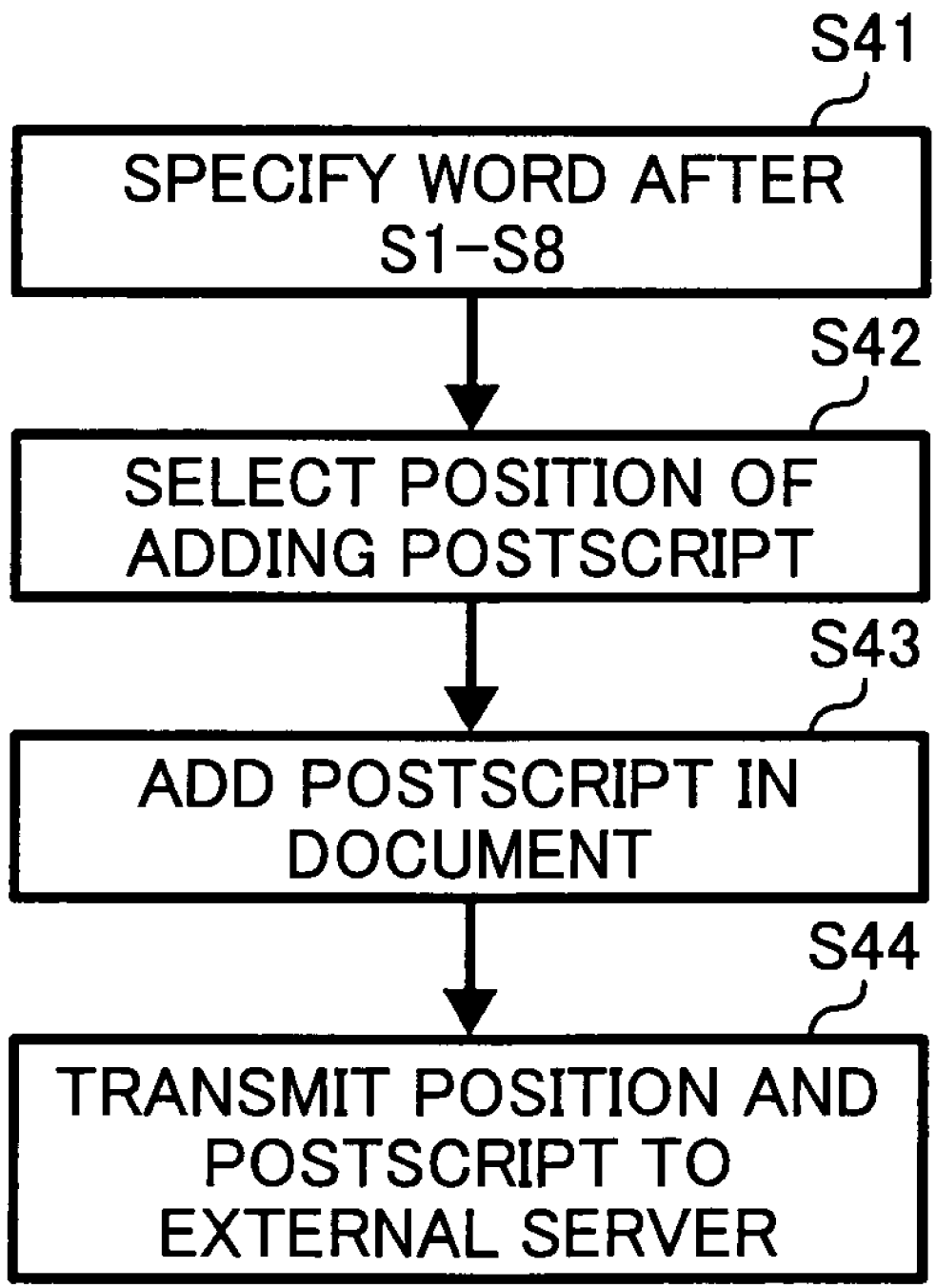
FIG. 24 illustrates a flowchart of postscript processing of document.

FIG. 24 illustrates a flowchart of postscript processing of document. In a step S41 of this FIG. 24, after the same processing as the steps S1-S8, a word may be specified to perform postscript processing around the word in the document. In a step S42, the document position, where the postscript processing is performed, is chosen from the word position specified at the step S41 like the step S32 in FIG. 21.

Further, in a step S43, the postscript information to add is input. The postscript information includes character string information, voice information, and image information. The inputting of voice information, image information, etc. may be performed by using the audio input part 102, the image input part 105, etc. installed in the information specification apparatus 100. In a step S44, the document position information chosen at the step S42 and the postscript information input at the step S43 are transmitted to the external server 400.

The external server 400 acquires the document position information and the postscript information transmitted from the information specification apparatus 100, and adds the postscript information to the document saved in the documentation management database 401 in the external server 400. FIG. 25 illustrates an example that postscript processing information is written in a document. With linking to the word information in the document position information chosen at the step S42, the postscript information may be added to. Thus, the information specification apparatus 100 capable of executing application which adds postscript information, such as character string information, voice information, and image information, to a word or a circumference portion of the word may be offered.

According to the information specification system, the server, and the information specification apparatus of this invention, the server and the information specification apparatus in which a document is saved may be connected through a network, a document specification mechanism to input discernment information for specifying the document saved in the server and a character input mechanism to input the word information may be provided in the information specification apparatus, the word information in the document specified with the document specification mechanism may be searched by using the word information partially input from a character input mechanism, and specification from the word information input partially may be performed easily and correctly by selecting the candidate of the word information specified, in particular, when the number of the keys provided on the character input mechanism of the information specification apparatus is small, word information may be specified quickly.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2005-205835 filed on Jul. 14, 2005 in the Japan Patent Office, the entire contents of which are incorporated by reference herein.

What is claimed:

1. An information specification system coupled to a network, comprising:
   a server to store a document including specific word information; and
   a mobile information specification apparatus connected to the server via the network, comprising:
   a display to display an electronic document;
   an image input mechanism to acquire 2-dimensional code information by imaging the 2-dimensional code information including specification information printed on the paper document;
   a document specification mechanism to specify the electronic document corresponding to specification information by transmitting specification information to specify the document stored in the server;
   a document information communication acquisition mechanism to receive a document specified by specification information included in the 2-dimensional code information;
   a character input mechanism to input character strings;
   a candidate information extractor to search and extract a word that includes the character strings from all words in the electronic document as candidate words;
   a candidate information display to display the candidate words; and
   a candidate information selector to choose desired word information from the candidate words displayed on the candidate information display.

2. The system of claim 1, wherein the character input mechanism includes a smaller number of keys than character kinds when inputting the word information, each key represents two or more character kinds.

3. The system of claim 1, wherein the word information in the document specified with the document specification mechanism is rearranged to form dictionary information, the dictionary information is acquired by the information specification apparatus to perform processing of selecting the candidates for the specific word information.

4. The system of claim 1, wherein the information specification apparatus acquires all or a part of text information of documents specified with the document specification mechanism, and performs processing of selecting the candidates for the specific word information.

5. The system of claim 1, wherein the word information partially input from the character input mechanism is transmitted to the server, processing of selecting the candidates for the specific word information is performed, the selected candidates are transmitted to the information specification apparatus by return.

6. The system of claim 1, wherein setting up the word information or arbitrary ranges of the document including the word information using the specified word information, arbitrary applications are performed according to the word information or the document of the range.

7. The system of claim 6, wherein the arbitrary applications present the word information or semantic information corresponding to the word information included in the range of the document.

8. The system of claim 6, wherein the arbitrary applications search on networks about the word information or the word information included in the range of the document.

9. The system of claim 6, wherein the arbitrary applications edit the word information or the document of the range.

10. A method of specifying word information, comprising;
storing a document and specification information that identifies the document in a server coupled to a network; and
a mobile information specification apparatus connected to the server via the network comprising:
imaging a 2-dimensional code printed on a surface of the document, the 2-dimensional code includes specification information;
extracting the specification information included in the 2-dimensional code;
specifying a document that is stored in the server and corresponds to the specification information by transmitting the specification information to the server;
receiving the document specified by the specification information from the server; inputting characters that form a port of a specific word information;
searching words that include the input characters from all the words included in the document acquired from the server;
displaying candidates for the specific word information; and
selecting a desired word information from the candidates for the specific word displayed on the candidate information display.

11. A mobile information specification apparatus connected to the server via the network, comprising:
a display to display an electronic document;
an image input mechanism to acquire a 2-dimensional code information by imaging the 2-dimensional code information including the specification information printed on the paper document;
a document specification mechanism to specify the electronic document corresponding to specification information by transmitting specification information to specify the document stored in the server;
a document information communication acquisition mechanism to receive a document specified by the specification information including the 2-dimensional code information;
a character input mechanism to input character strings;
a candidate information extractor to search and extract a word that includes the character strings from all words in the electronic document as candidate words;
a candidate information display to display the candidate words; and
a candidate information selector to choose a desired word from the candidate words displayed on the candidate information display.

* * * * *